US011177891B2

(12) United States Patent
Akiyama et al.

(10) Patent No.: US 11,177,891 B2
(45) Date of Patent: Nov. 16, 2021

(54) COMMUNICATION DEVICE, COMMUNICATION SYSTEM, AND COMMUNICATION METHOD

(71) Applicant: SONY SEMICONDUCTOR SOLUTIONS CORPORATION, Kanagawa (JP)

(72) Inventors: Keiji Akiyama, Tokyo (JP); Fumihiro Nishiyama, Saitama (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 16/636,685

(22) PCT Filed: Jul. 5, 2018

(86) PCT No.: PCT/JP2018/025467
§ 371 (c)(1),
(2) Date: Feb. 5, 2020

(87) PCT Pub. No.: WO2019/035284
PCT Pub. Date: Feb. 21, 2019

(65) Prior Publication Data
US 2020/0169328 A1 May 28, 2020

(30) Foreign Application Priority Data
Aug. 14, 2017 (JP) .............................. JP2017-156535

(51) Int. Cl.
*H04B 13/00* (2006.01)
*H04W 4/48* (2018.01)
*H04B 1/04* (2006.01)

(52) U.S. Cl.
CPC ......... *H04B 13/005* (2013.01); *H04B 1/0475* (2013.01); *H04W 4/48* (2018.02)

(58) Field of Classification Search
CPC ...... H04B 13/005; H04B 1/0475; H04W 4/48
See application file for complete search history.

(56) References Cited

U.S. PATENT DOCUMENTS 7,136,703 B1* 11/2006 Cappa ................ A61N 1/37247
607/9
8,455,111 B2 6/2013 Ohsawa et al.
(Continued)

FOREIGN PATENT DOCUMENTS

CN 101325427 A 12/2008
CN 102480326 A 5/2012
(Continued)

OTHER PUBLICATIONS

International Search Report and Written Opinion of PCT Application No. PCT/JP2018/025467, dated Aug. 14, 2018, 06 pages of ISRWO.
(Continued)

*Primary Examiner* — Brenda H Pham
(74) *Attorney, Agent, or Firm* — Chip Law Group

(57) ABSTRACT

A communication device that includes an antenna including a first electrode and a second electrode, at least one of the first electrode or the second electrode including a plurality of segmented electrodes. The communication device further includes a communication circuit, coupled to the antenna, that performs a transmission operation and a reception operation of transmission data between a device and the communication circuit based on a communication protocol that includes a plurality of communication stages. The communication device further includes a switch that switches whether or not each of the plurality of segmented electrodes is to be coupled to the communication circuit and a controller that changes an effective electrode area of at least one of the first electrode or the second electrode by the
(Continued)

switch, based on at least one of the operations of the communication circuit, a type of the transmission data, or the communication stages.

12 Claims, 17 Drawing Sheets

(56) References Cited

U.S. PATENT DOCUMENTS

| | | |
|---|---|---|
| 2012/0026129 A1 | 2/2012 | Kawakami |
| 2018/0169422 A1* | 6/2018 | Ha ..................... A61N 1/36125 |
| 2019/0215082 A1* | 7/2019 | Fukuda ................ H04B 13/005 |

FOREIGN PATENT DOCUMENTS

| | | |
|---|---|---|
| DE | 102013019746 A1 | 5/2015 |
| GN | 102347806 A | 2/2012 |
| JP | 2010-177767 A | 8/2010 |
| JP | 2010-177767 A | 10/2011 |
| JP | 2011-199472 A | 10/2011 |
| JP | 2011-244082 A | 12/2011 |
| JP | 2012-034157 A | 2/2012 |

OTHER PUBLICATIONS

Office Action for CN Patent Application No. 201880051720.7, dated Mar. 25, 2021, 09 pages of English Translation and 08 pages of Office Action.

* cited by examiner

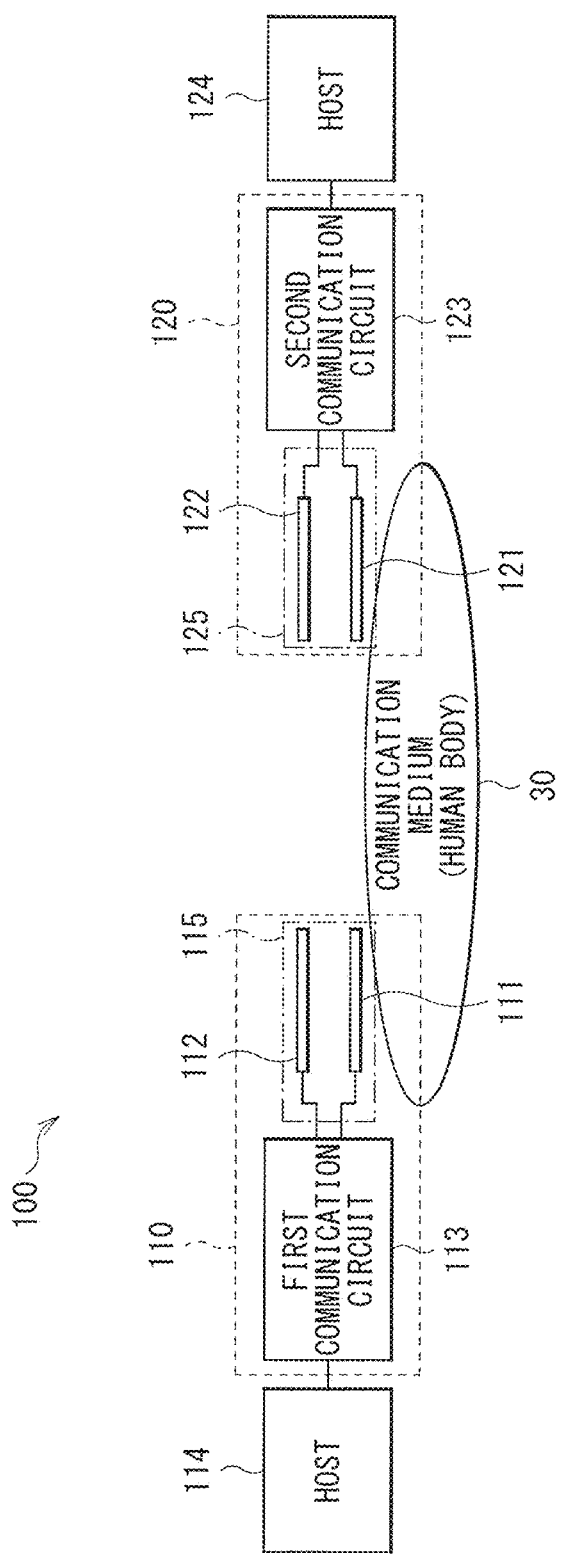
[FIG. 1]

[FIG. 2]
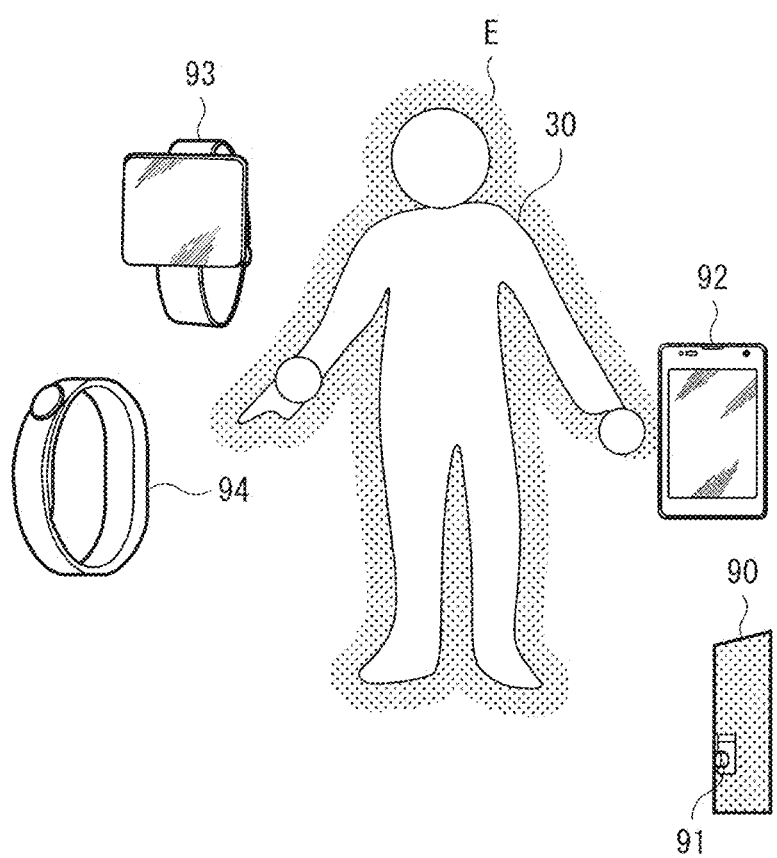

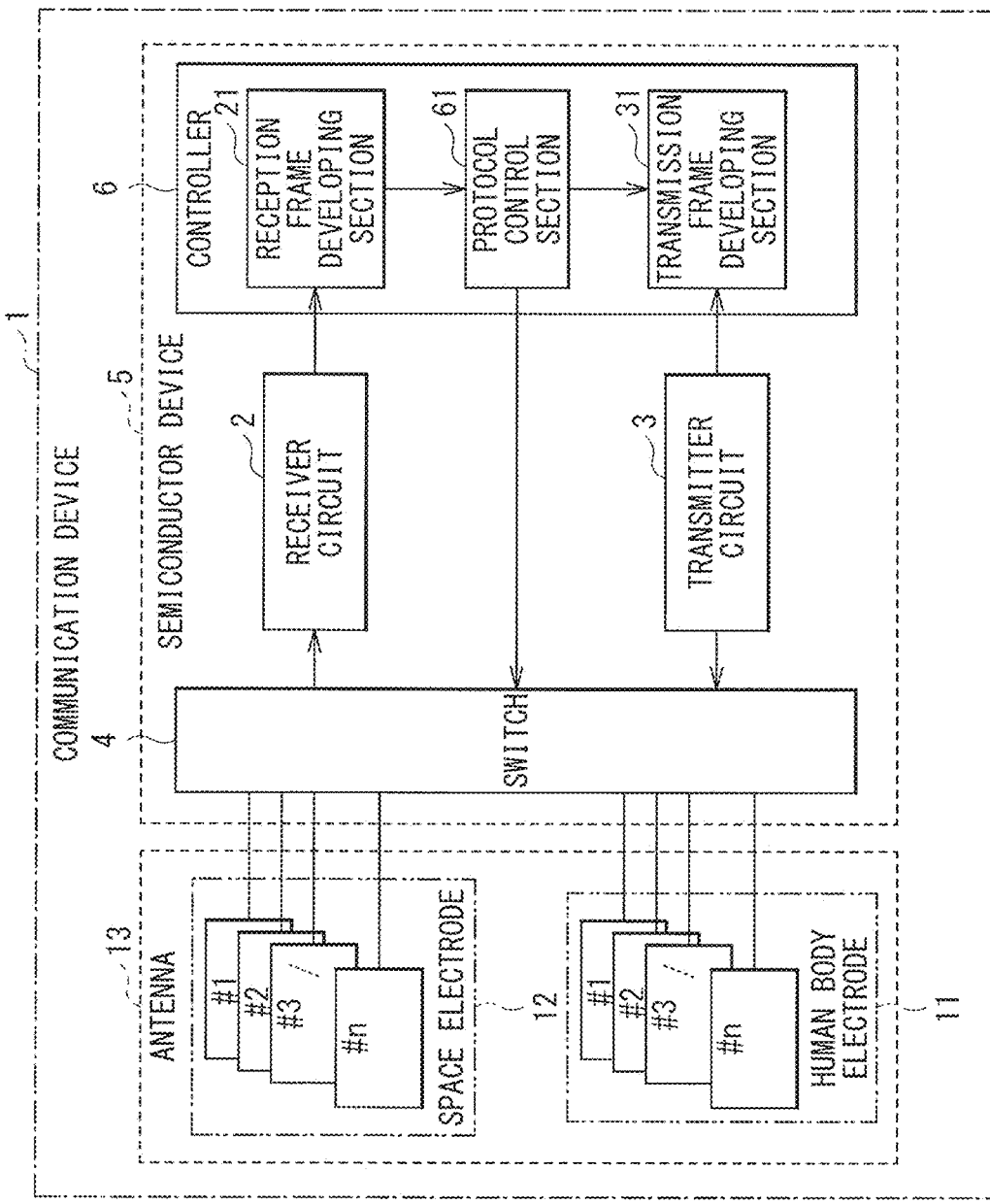
[FIG. 3]

[FIG. 4]
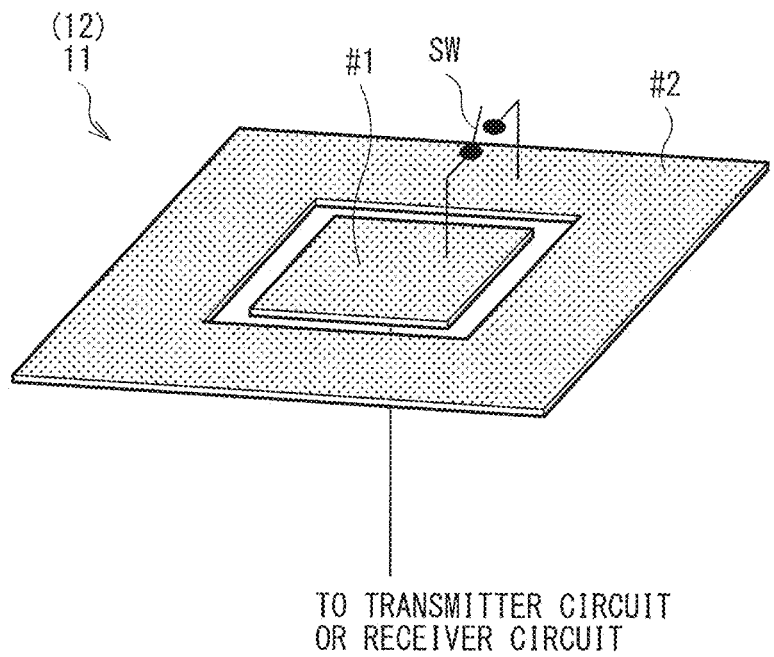
[FIG. 5]
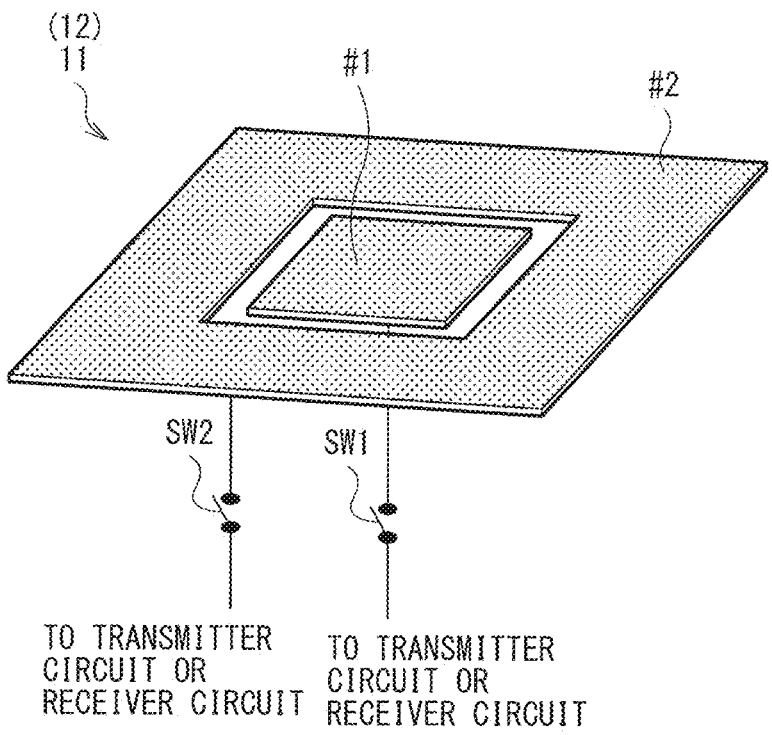

[FIG. 6]
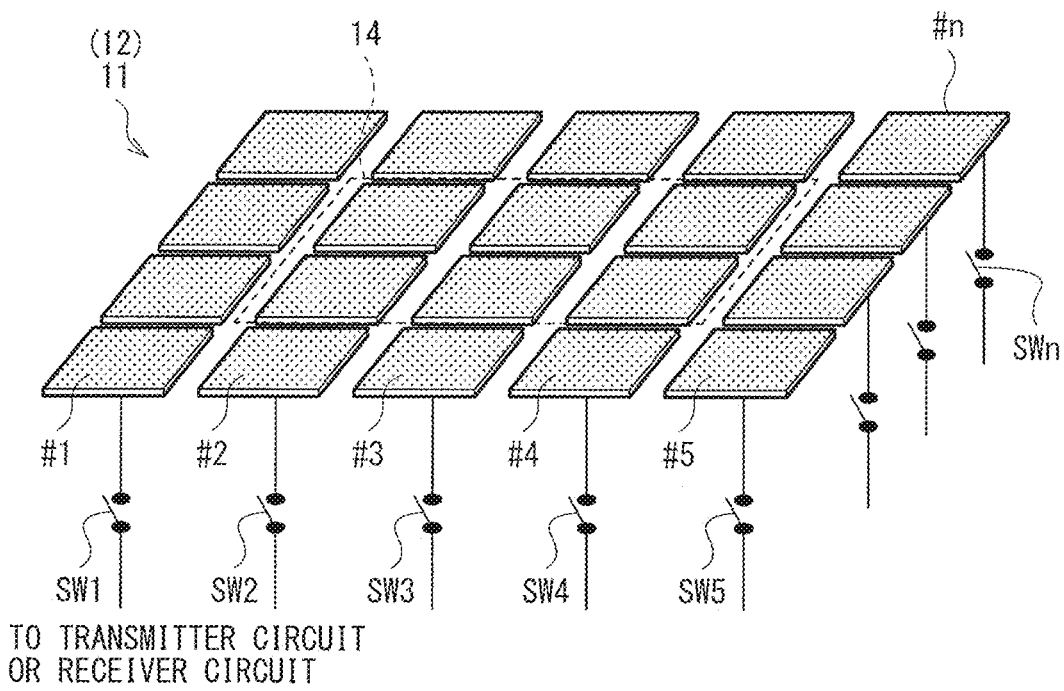
[FIG. 7]
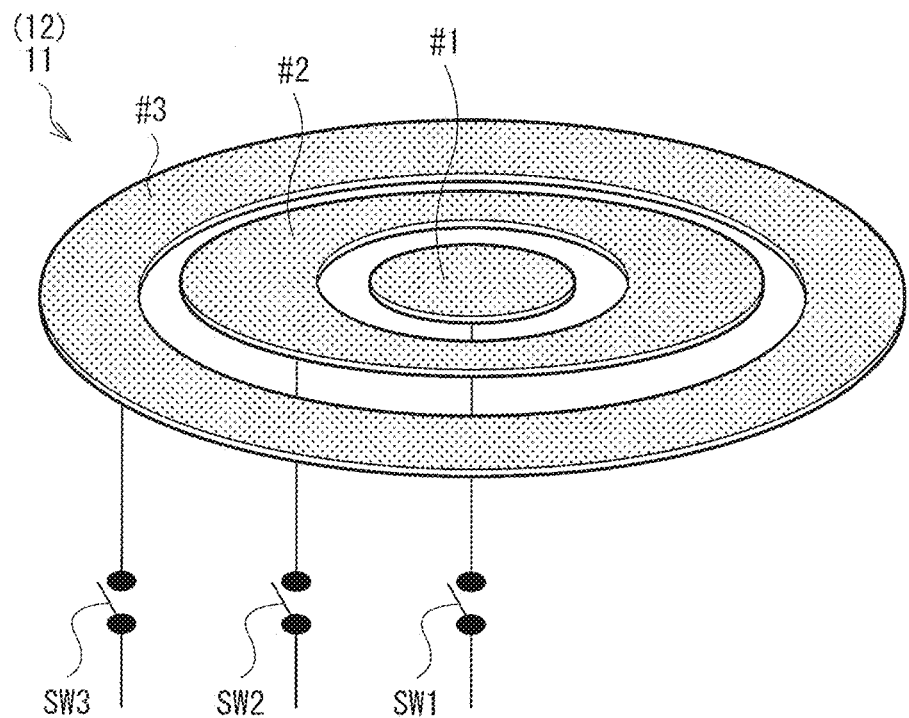

[FIG. 8]
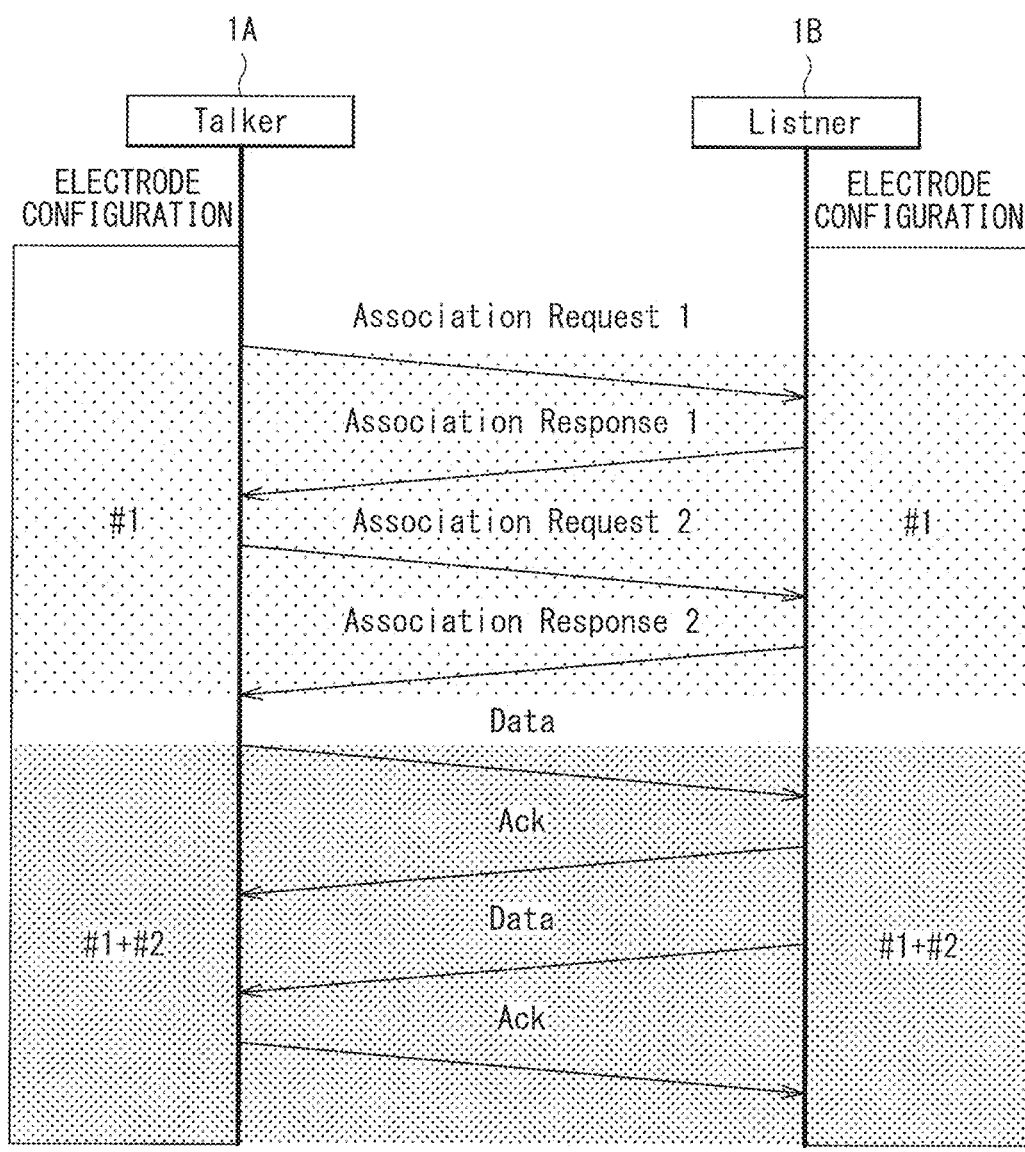

[FIG. 9]
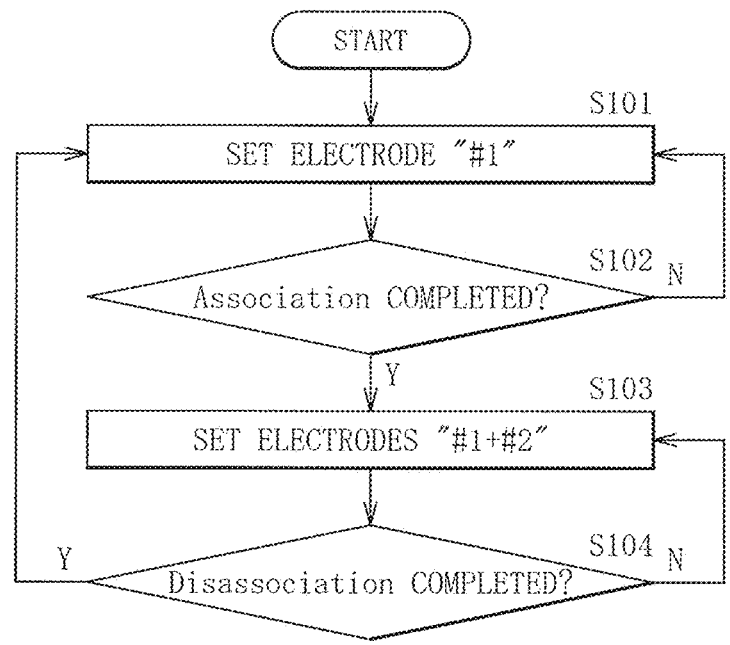

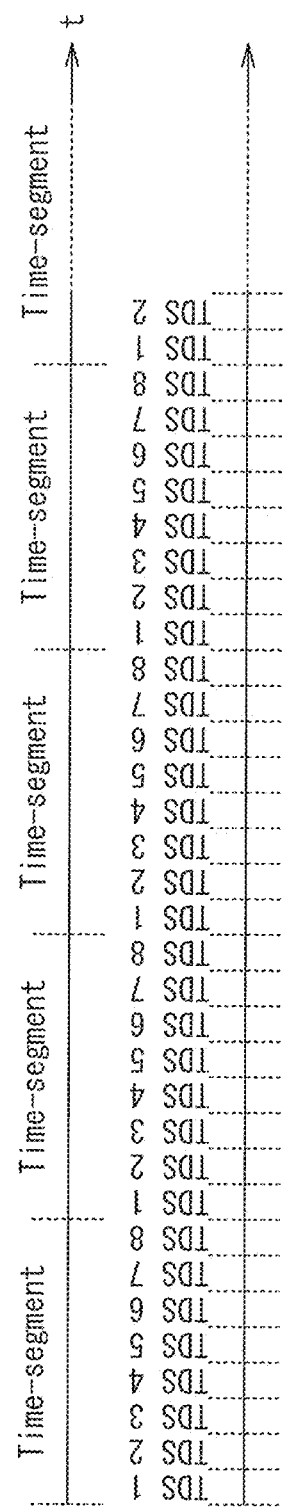
[FIG. 10]

[FIG. 11]
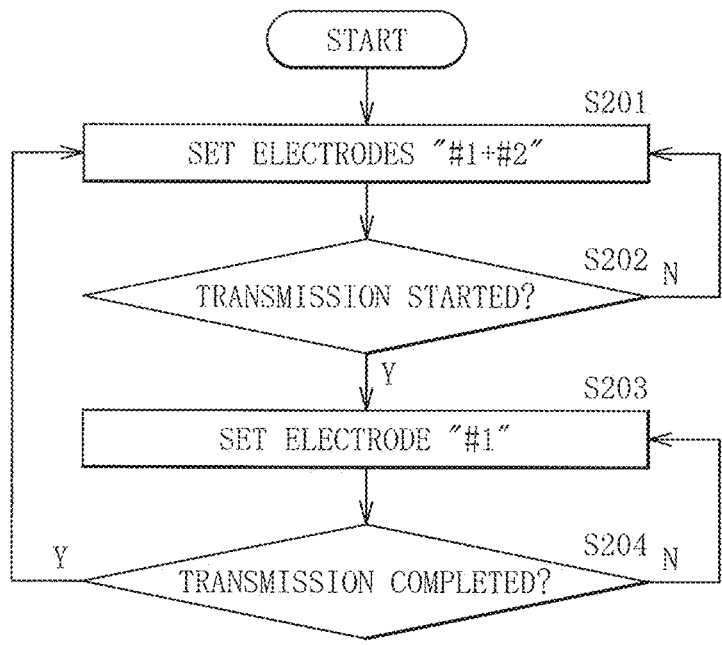

[FIG. 12]
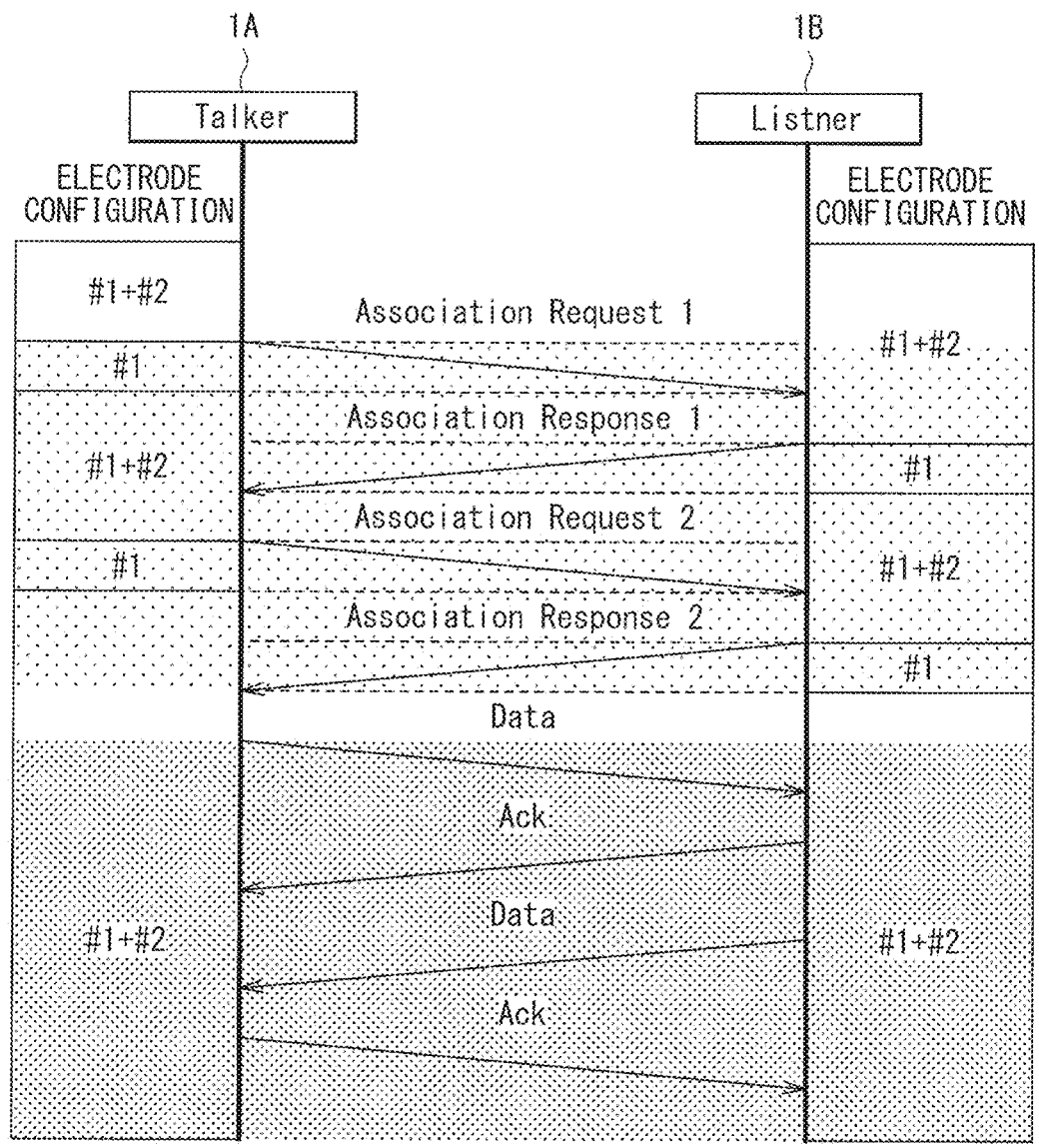

[FIG. 13]
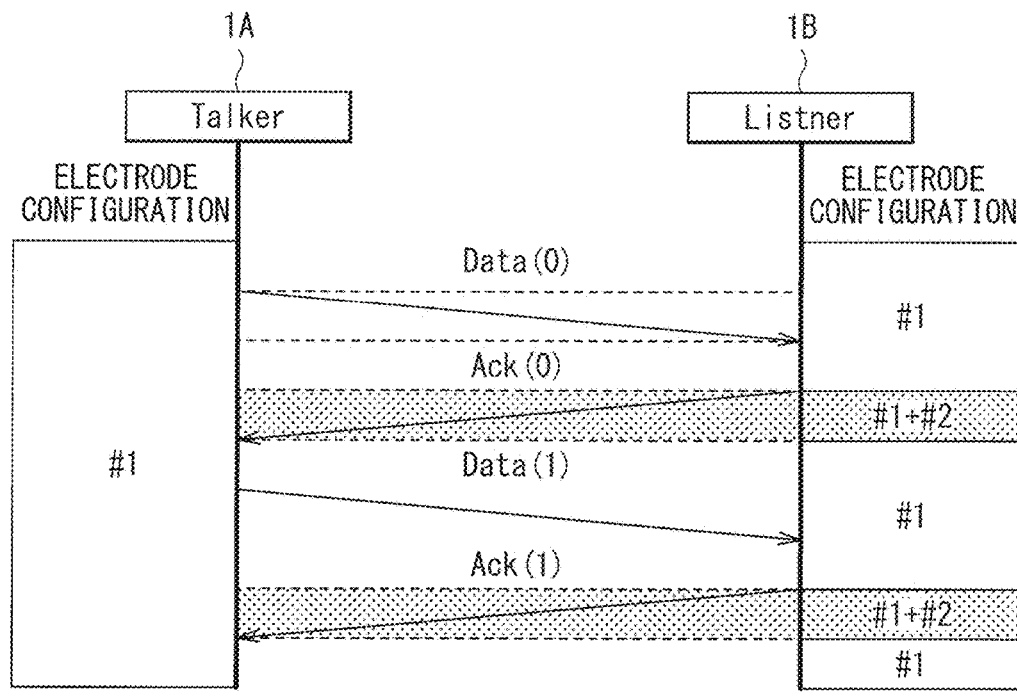
[FIG. 14]
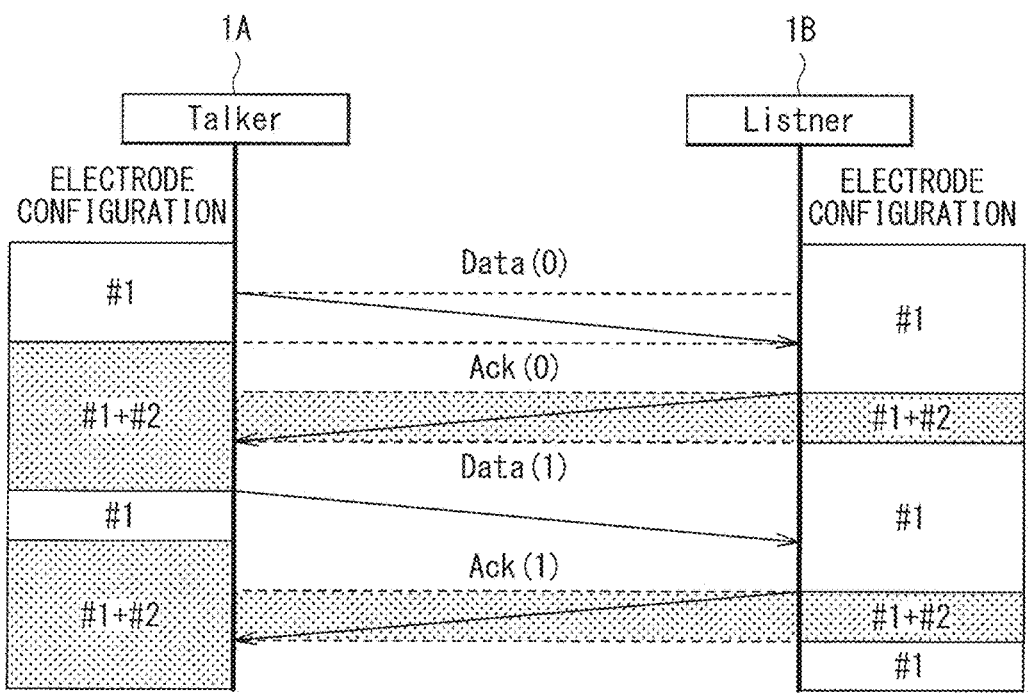

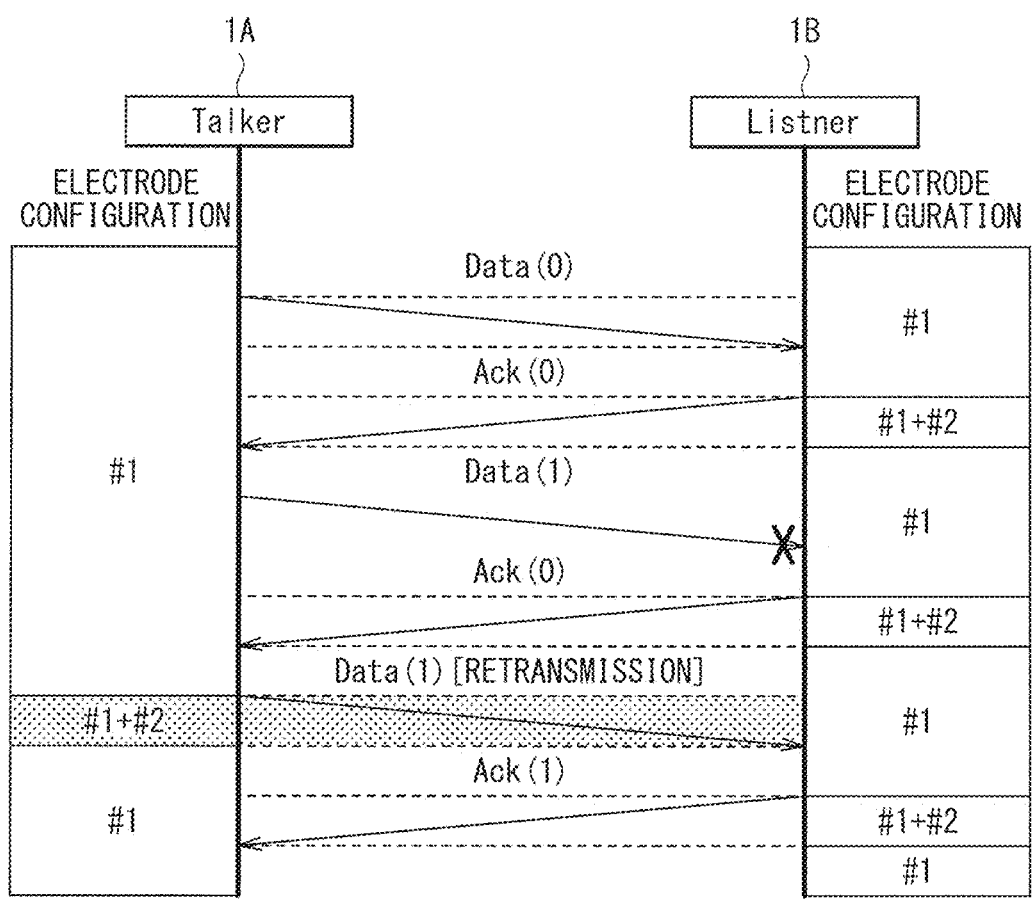
[FIG. 15]

[FIG. 16]
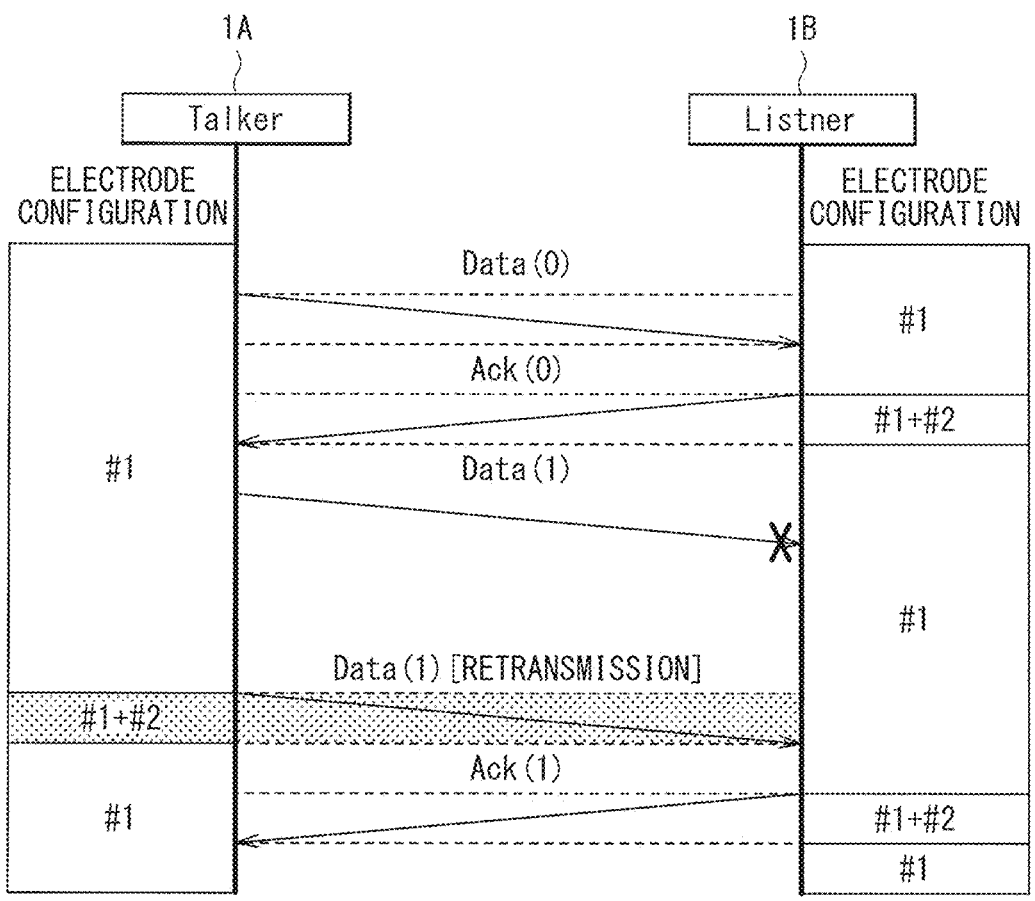

[FIG. 17]
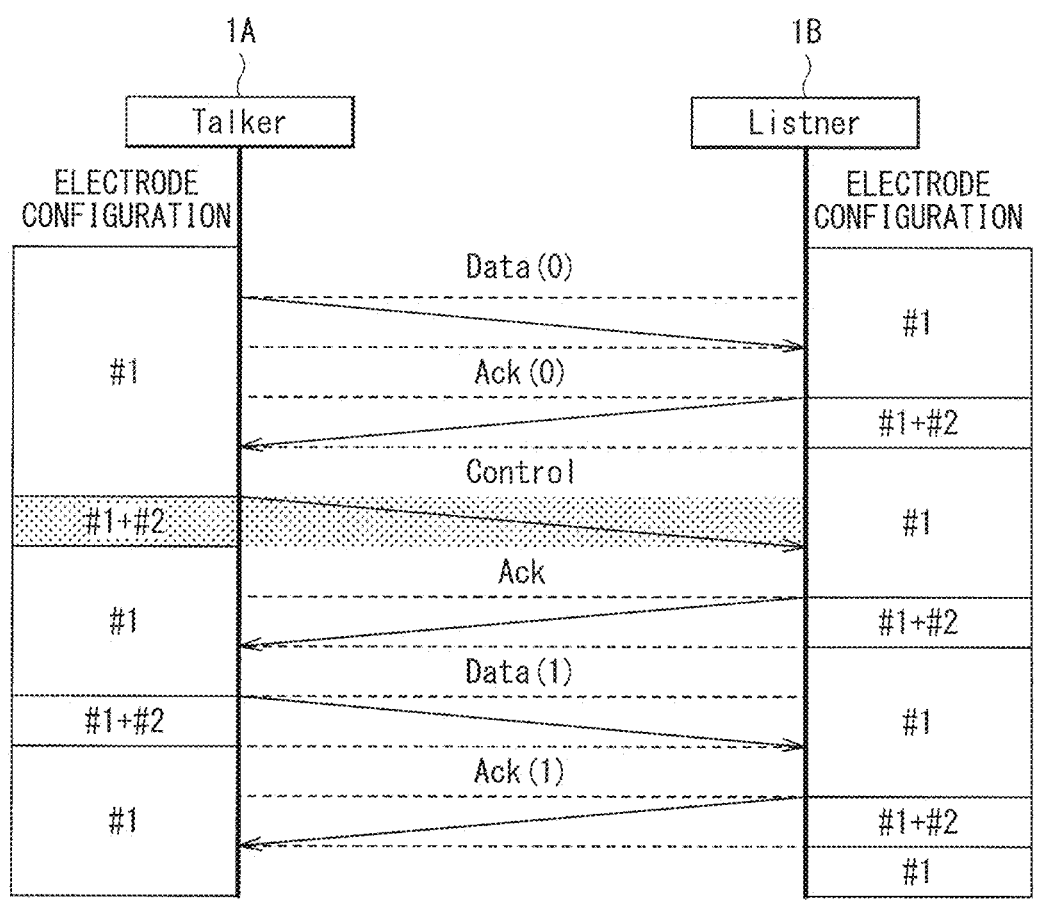

[FIG. 18]
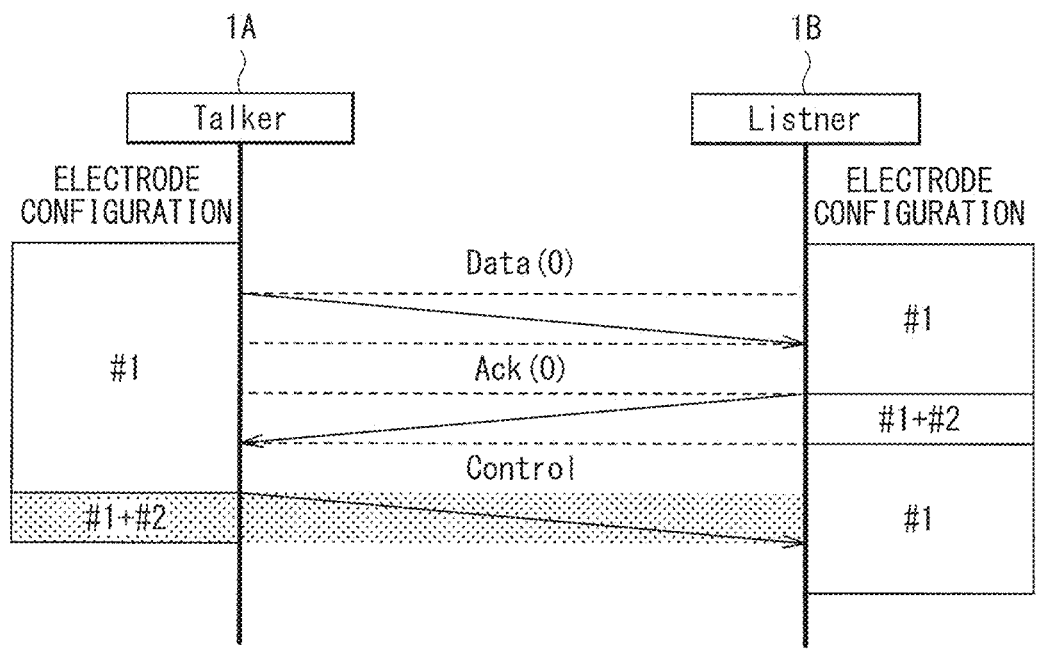

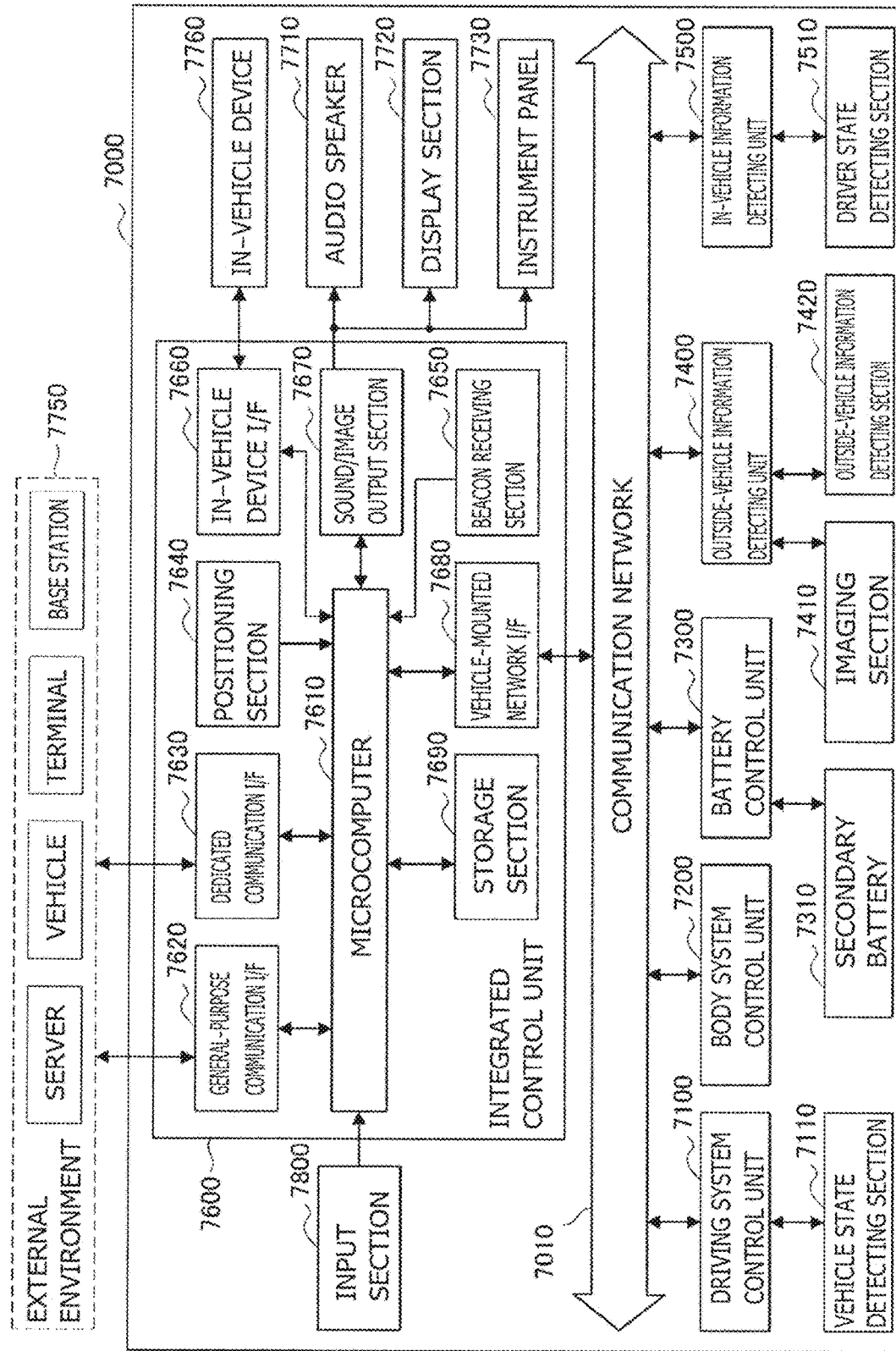

[FIG. 20]
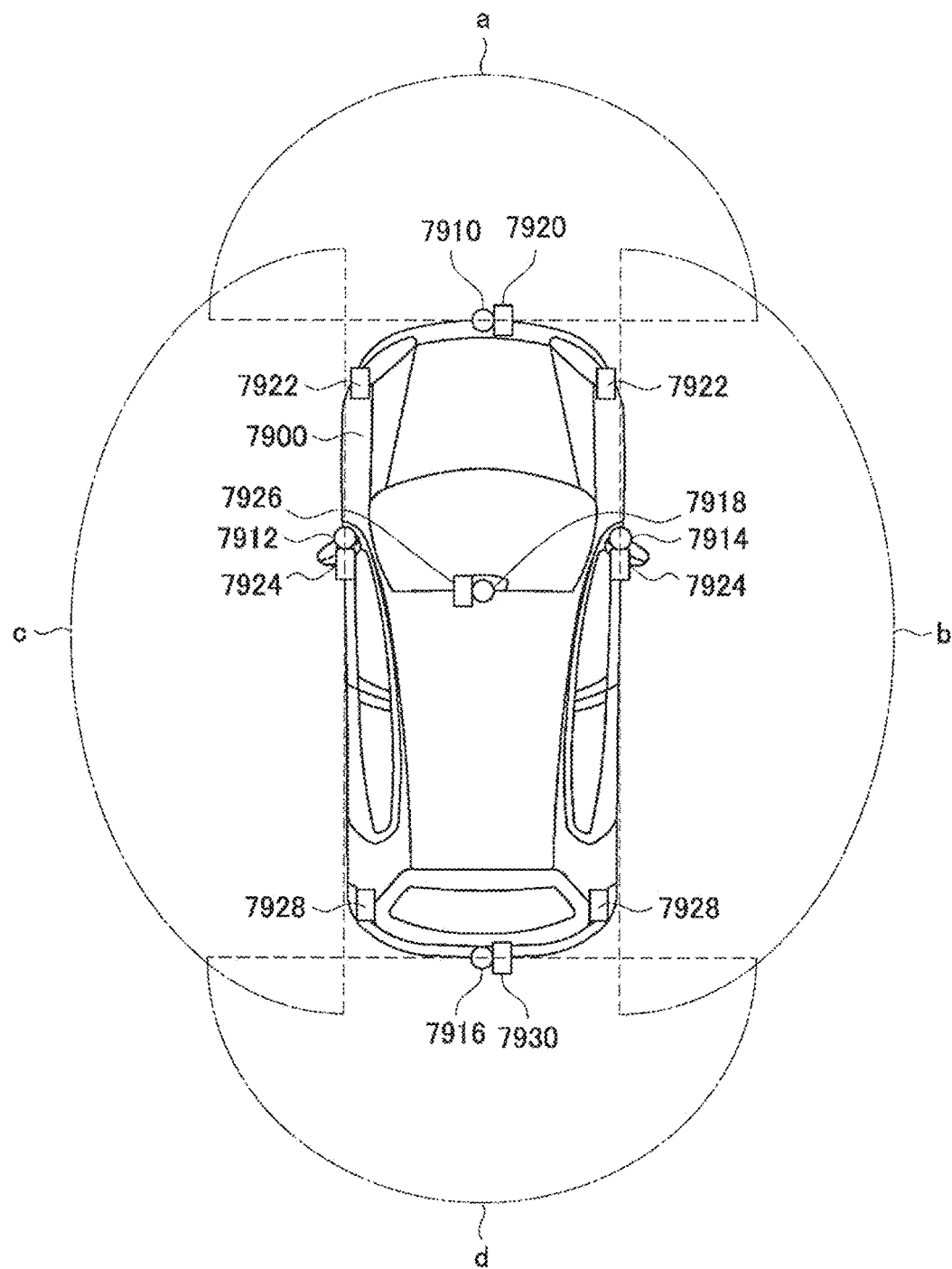

COMMUNICATION DEVICE, COMMUNICATION SYSTEM, AND COMMUNICATION METHOD

CROSS REFERENCE TO RELATED APPLICATIONS

This application is a U.S. National Phase of International Patent Application No. PCT/JP2018/025467 filed on Jul. 5, 2018, which claims priority benefit of Japanese Patent Application No. JP 2017-156535 filed in the Japan Patent Office on Aug. 14, 2017. Each of the above-referenced applications is hereby incorporated herein by reference in its entirety.

TECHNICAL FIELD

The present disclosure relates to a communication device, a communication system, and a communication method that are suitable for communication using a human body as a communication medium.

BACKGROUND ART

For example, a communication system using an electric field communication technology where a human body serves as a communication medium has been known.

CITATION LIST

Patent Literature

PTL 1: Japanese Unexamined Patent Application Publication No. 2010-177767
PTL 2: Japanese Unexamined Patent Application Publication No. 2011-244082

SUMMARY OF THE INVENTION

In a communication system using an electric field communication technology, communication performance varies depending on an electrode size of an antenna. An increase in the electrode size increases a communicable range but may cause erroneous communication (erroneous connection) that is not intended by a user.

It is desirable to provide a communication device, a communication system, and a communication method that make it possible to suppress erroneous communication and stabilize communication.

A communication device according to an embodiment of the present disclosure includes: an antenna including a first electrode and a second electrode, in which at least one of the first electrode or the second electrode includes a plurality of segmented electrodes; a communication circuit that is coupled to the antenna, and performs, through the antenna, a transmission operation and a reception operation of transmission data between a device to be communicated and the communication circuit, in accordance with a communication protocol that includes a plurality of communication stages; a switch that switches whether or not each of the plurality of segmented electrodes is to be coupled to the communication circuit, to change effective electrode area of at least one of the first electrode or the second electrode; and a controller that changes the effective electrode area of at least one of the first electrode or the second electrode by the switch, on the basis of at least one of the operations of the communication circuit, a type of the transmission data, or the communication stages.

A communication system according to an embodiment of the present disclosure includes: a first communication device; and a second communication device that performs transmission of transmission data between the first communication device and the second communication device. At least one of the first communication device or the second communication device includes: an antenna including a first electrode and a second electrode, in which at least one of the first electrode or the second electrode includes a plurality of segmented electrodes; a communication circuit that is coupled to the antenna, and performs, through the antenna, a transmission operation and a reception operation of the transmission data between a device to be communicated and the communication circuit, in accordance with a communication protocol that includes a plurality of communication stages, in which the first communication device or the second communication device serves as the device to be communicated; a switch that switches whether or not each of the plurality of segmented electrodes is to be coupled to the communication circuit, to change effective electrode area of at least one of the first electrode or the second electrode; and a controller that changes the effective electrode area of at least one of the first electrode or the second electrode by the switch, on the basis of at least one of the operations of the communication circuit, a type of the transmission data, or the communication stages.

A communication method according to an embodiment of the present disclosure includes: performing, with a communication circuit coupled to an antenna, a transmission operation and a reception operation between a device to be communicated and the communication circuit through the antenna, in accordance with a communication protocol that includes a plurality of communication stages, in which the antenna includes a first electrode and a second electrode, and at least one of the first electrode or the second electrode includes a plurality of segmented electrodes; switching, with a switch, whether or not each of the plurality of segmented electrodes is to be coupled to the communication circuit, to change effective electrode area of at least one of the first electrode or the second electrode; and changing, by controlling the switch by a controller, the effective electrode area of at least one of the first electrode or the second electrode, on the basis of at least one of the operations of the communication circuit, a type of the transmission data, or the communication stages.

In the communication device, the communication system, or the communication method according to the embodiment of the present disclosure, the effective electrode area of at least one of the first electrode or the second electrode is changed on the basis of at least one of the operations of the communication circuit, the type of transmission data, or the communication stages.

The effective electrode area of at least one of the first electrode or the second electrode is changed on the basis of at least one of the operations of the communication circuit, the type of transmission data, or the communication stages. Hence, the communication device, the communication system, or the communication method according to the embodiment of the present disclosure makes it possible to suppress erroneous communication and stabilize communication.

It is to be noted that the effect described herein is not necessarily limitative and any effect described in the present disclosure may be achieved.

BRIEF DESCRIPTION OF DRAWINGS

FIG. 1 is a configuration diagram that illustrates an outline of a communication system according to a comparative example where a human body is used as a communication medium.

FIG. 2 is an explanatory diagram that illustrates an outline of a communication system according to a comparative example.

FIG. 3 is a block diagram that schematically illustrates a configuration example of a communication device according to a first embodiment of the present disclosure.

FIG. 4 is a structural diagram that illustrates a first example of an electrode structure of an antenna of the communication device according to the first embodiment.

FIG. 5 is a structural diagram that illustrates a second example of the electrode structure of the antenna of the communication device according to the first embodiment.

FIG. 6 is a structural diagram that illustrates a third example of the electrode structure of the antenna of the communication device according to the first embodiment.

FIG. 7 is a structural diagram that illustrates a fourth example of the electrode structure of the antenna of the communication device according to the first embodiment.

FIG. 8 is an explanatory diagram that illustrates an example of a communication operation in the communication system according to the first embodiment along with a switching operation for the electrode structure.

FIG. 9 is a flowchart that schematically illustrates an example of a switching control flow for the electrode structure by the communication device according to the first embodiment.

FIG. 10 is an explanatory diagram that illustrates an example of a transmission format according to the CCCC-PHY standards.

FIG. 11 is a flowchart that schematically illustrates an example of a switching control flow for an electrode structure by a communication device according to a second embodiment.

FIG. 12 is an explanatory diagram that illustrates an example of a communication operation in a communication system according to a third embodiment along with the switching operation for the electrode structure.

FIG. 13 is an explanatory diagram that illustrates an example of a communication operation in a communication system according to a fourth embodiment along with a first example of the switching operation for the electrode structure.

FIG. 14 is an explanatory diagram that illustrates an example of the communication operation in the communication system according to the fourth embodiment along with a second example of the switching operation for the electrode structure.

FIG. 15 is an explanatory diagram that illustrates an example of a communication operation in a communication system according to a fifth embodiment along with the first example of the switching operation for the electrode structure.

FIG. 16 is an explanatory diagram that illustrates an example of the communication operation in the communication system according to the fifth embodiment along with the second example of the switching operation for the electrode structure.

FIG. 17 is an explanatory diagram that illustrates an example of a communication operation in a communication system according to a sixth embodiment along with the first example of the switching operation for the electrode structure.

FIG. 18 is an explanatory diagram that illustrates an example of the communication operation in the communication system according to the sixth embodiment along with the second example of the switching operation for the electrode structure.

FIG. 19 is a block diagram depicting an example of schematic configuration of a vehicle control system.

FIG. 20 is a diagram of assistance in explaining an example of installation positions of an outside-vehicle information detecting section and an imaging section.

MODES FOR CARRYING OUT THE INVENTION

Embodiments of the present disclosure are described in detail hereinbelow with reference to the drawings. It is to be noted that description is made in the following order.
0. Comparative Example (Outline and Problem of Communication System Using Human Body As Communication Medium) (FIG. 1 to FIG. 2)
1. First Embodiment (FIG. 3 to FIG. 9)
   1.1 Configuration
   1.2 Operation
   1.3 Effects
2. Second Embodiment (FIG. 10 to FIG. 11)
   2.1 Configuration and Operation
   2.2 Effects
3. Third Embodiment (FIG. 12)
   3.1 Configuration and Operation
4. Fourth Embodiment (FIG. 13 to FIG. 14)
   4.1 Configuration and Operation
5. Fifth Embodiment (FIG. 15 to FIG. 16)
   5.1 Configuration and Operation
6. Fifth Embodiment (FIG. 17 to FIG. 18)
   6.1 Configuration and Operation
7. Seventh Embodiment (Application Example) (FIG. 19 to FIG. 20)
8. Other Embodiments

0. COMPARATIVE EXAMPLE (Outline of Communication System Using Human Body as Communication Medium)

FIG. 1 and FIG. 2 illustrate an outline of a communication system according to a comparative example using an electric field communication technology, in which a human body 30 serves as a communication medium.

A communication system 100 according to the comparative example includes a first communication device 110 and a second communication device 120.

For example, as illustrated in FIG. 2, the communication system 100 is usable for communication between a communication device installed in a wearable device, such as a smartwatch 93 or a wristband terminal 94, and a communication device installed in a door knob 91 of a door 90, a smartphone 92, or the like. For example, either one of the first communication device 110 and the second communication device 120 may be provided in the smartwatch 93 or the like while the other one of the first communication device 110 and the second communication device 120 is provided in the smartphone 92 or the like. The communication system 100 is also usable for, for example, locking and unlocking of a door of an automobile. For example, either one of the first communication device 110 and the second communication device 120 is provided in the door of the automobile. In addition to the door of the automobile, the communication system 100 is also usable for, for example, locking and unlocking of the door 90 with a locking function used in entering and leaving a room.

The first communication device 110 includes a first antenna 115 and a first communication circuit 113. The first antenna 115 includes a first human body electrode 111 and a first space electrode 112 as communication electrodes. The first communication circuit 113 is coupled to a host 114.

The second communication device 120 includes a second antenna 125 and a second communication circuit 123. The second antenna 125 includes a second human body electrode 121 and a second space electrode 122 as communication electrodes. The second communication circuit 123 is coupled to a host 124.

The first communication circuit 113 and the second communication circuit 123 each include a communication circuit using an electric field communication method (quasi-electrostatic field communication method).

The first communication circuit 113 may include at least a transmitter circuit (transmitter). The second communication circuit 123 may include at least a receiver circuit (receiver). Alternatively, the first communication circuit 113 and the second communication circuit 123 may each include a transmitter/receiver circuit for bidirectional communication between the first communication device 110 and the second communication device 120.

In a case where a signal is to be transmitted from the first communication device 110, the first communication circuit 113 generates a transmission signal of a potential difference, which includes a signal modulated by a predetermined modulation method, between the first human body electrode 111 and the first space electrode 112. The first human body electrode 111 is disposed closer to the human body 30 than the first space electrode 112. This allows the first human body electrode 111 to be electrostatically coupled to the communication medium (human body 30) more strongly than the first space electrode 112.

In such a communication system, as a portion of the human body 30 comes closer to the second human body electrode 121 than the second space electrode 122, a human-body-side communication path where the human body 30 serves as a communication medium is formed between the first human body electrode 111 and the second human body electrode 121. In addition, a space-side communication path where space (e.g., air) serves as a communication medium is formed between the first space electrode 112 and the second space electrode 122.

A potential difference based on transmission signals transmitted through the human-body-side communication path and the space-side communication path occurs between the second human body electrode 121 and the second space electrode 122. The second communication circuit 123 detects the potential difference that occurs between the second human body electrode 121 and the second space electrode 122, obtains a reception signal by performing a demodulating process corresponding to the modulation method of the first communication circuit 113, and outputs the reception signal as an output signal.

In the electric field communication method (quasi-electrostatic field communication method), an increase in a strength of human-body-and-electrode coupling between the first communication device 110 and the second communication device 120 enables communication. Although communication is enabled when a person touches a human body electrode, it is also possible to perform communication even when the person simply comes close to the human body electrode, owing to an electric field E distributed on a surface of the human body as illustrated in FIG. 2. Thus, communication is possible only in an immediate vicinity of the human body 30. Moreover, compatibility with a wearable device is high.

(Problem)

A communication performance of such a communication system 100 varies depending on an electrode size (effective electrode area) of a communication electrode. A large effective electrode area usually enables robust data transmission. In a case where the human body 30 serves as a communication medium, a user is supposed to deliberately come close to a device to be communicated for communication. Accordingly, it is desirable to establish coupling between the human body 30 and the device to be communicated for start of communication in response to the device to be communicated coming sufficiently close to enter a vicinity of the human body 30 at a distance of several centimeters or less. However, as a result of increasing the effective electrode area to achieve a robust transmission performance, a communicable range is increased, possibly causing erroneous communication (erroneous connection) that is not intended by the user.

Accordingly, regarding a change in an electrode size in a communication device, PTL 1 (Japanese Unexamined Patent Application Publication No. 2010-177767) discloses a technique of selecting a suitable one out of a plurality of combinations of electrodes on the basis of intensity and noise level of a received signal.

PTL 2 (Japanese Unexamined Patent Application Publication No. 2011-244082) discloses a technique of selecting a signal electrode suitable for communication in accordance with a potential difference between a signal electrode and a ground electrode.

PTL 1 and PTL 2, which relate to a method of selecting an electrode for robust data transmission, provide no problem solution for preventing erroneous communication unintended by a user.

1. FIRST EMBODIMENT

[1.1 Configuration]
(Overall Configuration of Communication Device)

FIG. 3 schematically illustrates a configuration example of a communication device 1 according to a first embodiment of the present disclosure.

The communication device 1 according to the present embodiment may be used as at least one of the first communication device 110 or the second communication device 120 of the communication system 100 according to the above-described comparative example. In this case, the first communication device 110 and the second communication device 120 may each be a transmitter/receiver that bidirectionally transmit and receive data. For example, a device to be communicated with by the communication device 1 according to the present embodiment may be the first communication device 110, while the communication device 1 according to the present embodiment is the second communication device 120.

An example of standards for standardization of a communication system using an electric field communication technology is ISO/IEC 17982 CCCC PHY (Closed Capacitive Coupling Communication Physical Layer). The communication device 1 according to the present embodiment transmits and receives transmission data in accordance with transmission format and communication protocol compliant with, for example, the ISO/IEC 17982 CCCC PHY (hereinafter, referred to as CCCC-PHY) standards.

The communication device 1 according to the present embodiment includes an antenna 13, a receiver circuit 2 that performs a reception operation for receiving reception data through the antenna 13 from the device to be communicated, and a transmitter circuit 3 that performs a transmission operation for transmitting transmission data through the antenna to the device to be communicated. The communication device 1 also includes a switch 4 disposed between the antenna 13 and the receiver circuit 2 and transmitter circuit 3, and a controller 6 that controls the receiver circuit 2 and the transmitter circuit 3.

For example, the antenna 13 corresponds to the first antenna 115 of the first communication device 110 or the second antenna 125 of the second communication device 120 in FIG. 1 described above. The antenna 13 includes a human body electrode 11 as a first electrode and a space electrode 12 as a second electrode. For example, the human body electrode 11 corresponds to the first human body electrode 111 of the first communication device 110 or the second human body electrode 121 of the second communication device 120 in FIG. 1 described above. For example, the space electrode 12 corresponds to the first space electrode 112 of the first communication device 110 or the second space electrode 122 of the second communication device 120 in FIG. 1 described above.

At least one of the human body electrode 11 or the space electrode 12 includes a plurality of segmented electrodes #1, #2, . . . #n having a later-described structure as illustrated in FIG. 4 to FIG. 7.

The receiver circuit 2, the transmitter circuit 3, the switch 4, and the controller 6 may be disposed in a single semiconductor device (IC (Integrated Circuit)) 5.

The receiver circuit 2 and the transmitter circuit 3 are each coupled to the antenna 13 through the switch 4. The receiver circuit 2 and the transmitter circuit 3 are each a communication circuit that performs the transmission operation and the reception operation of transmission data relative to the device to be communicated through the antenna, in accordance with the communication protocol that includes a plurality of communication stages (communication phases). For example, the receiver circuit 2 and the transmitter circuit 3 each time-divisionally perform the transmission operation and the reception operation. For example, the receiver circuit 2 and the transmitter circuit 3 each transmit transmission data to the device to be communicated for each time segment including a plurality of time slots segmented into a predetermined number.

The switch 4 is able to switch between an electrical connection relationship between the antenna 13 and the receiver circuit 2 and an electrical connection relationship between the antenna 13 and the transmitter circuit 3. Moreover, the switch 4 may be a switch that switches whether or not the plurality of segmented electrodes #1, #2, . . . #n is independently to be coupled to the receiver circuit 2 or the transmitter circuit 3 to change effective electrode area of at least one of the human body electrode 11 or the space electrode 12.

The controller 6 includes a reception frame developing section 21, a transmission frame developing section 31, and a protocol control section 61.

The reception frame developing section 21 performs data processing of reception data received by the receiver circuit 2.

The transmission frame developing section 31 generates transmission data to be transmitted by the transmitter circuit 3.

In a case where the receiver circuit 2 is to receive the reception data from the device to be communicated, the controller 6 controls the switch 4 to electrically couple the antenna 13 and the receiver circuit 2.

In a case where the transmitter circuit 3 is to transmit the transmission data to the device to be communicated, the controller 6 controls the switch 4 to electrically couple the antenna 13 and the transmitter circuit 3.

The protocol control section 61 may be a controller that changes the effective electrode area of at least one of the human body electrode 11 or the space electrode 12 with use of the switch 4 on the basis of the communication stages of the communication protocol.

(Example of Electrode Structure of Antenna 13)

FIG. 4 illustrates a first example of an electrode structure of the antenna 13.

At least one of the human body electrode 11 or the space electrode 12 may include two segmented electrodes #1 and #2 as illustrated in FIG. 4. In this case, the segmented electrode #1 may be smaller in electrode area than the segmented electrode #2. The segmented electrode #1 may be in a rectangular shape and the segmented electrode #2 may be provided surrounding a periphery of the segmented electrode #1.

The segmented electrode #1 and the segmented electrode #2 may be selectively coupled to each other through an analog switch SW. The analog switch SW may be included in the switch 4. The segmented electrode #1 may be coupled to the receiver circuit 2 or the transmitter circuit 3 through the switch 4. Thus, only the segmented electrode #1 may be coupled to the receiver circuit 2 or the transmitter circuit 3 when the analog switch SW is off and both the segmented electrode #1 and the segmented electrode #2 may be coupled to the receiver circuit 2 or the transmitter circuit 3 when the analog switch SW is on. When the analog switch SW is off, only the electrode area of the segmented electrode #1 becomes the effective electrode area. Meanwhile, when the analog switch SW is on, total electrode area of the segmented electrode #1 and the segmented electrode #2 becomes the effective electrode area. It is to be noted that since the communication system 100 as illustrated in FIG. 1 and FIG. 2, which uses the electric field communication technology where the human body 30 serves as the communication medium, uses a signal with a frequency approximately in a range from DC to several ten MHz, the analog switch SW is usable to switch electrode coupling instead of an RF (Radio Frequency) switch.

It is to be noted that although FIG. 4 illustrates an example where only the two segmented electrodes #1 and #2 are provided, additional single or plurality of segmented electrodes may be provided around the segmented electrode #2, and the segmented electrodes may be able to be selectively and mutually coupled through the analog switch SW.

FIG. 5 illustrates a second example of the electrode structure of the antenna 13.

At least one of the human body electrode 11 or the space electrode 12 may have an electrode structure illustrated in FIG. 5. The electrode structure of FIG. 5 is different in a configuration of the analog switch SW from the electrode structure of FIG. 4. In the electrode structure of FIG. 5, the segmented electrode #1 is coupled to the receiver circuit 2 or the transmitter circuit 3 through an analog switch SW1. The segmented electrode #2 is coupled to the receiver circuit 2 or the transmitter circuit 3 through an analog switch SW2.

The analog switches SW1 and SW2 may be included in the switch 4. Thus, when the analog switch SW1 is on and the analog switch SW2 is off, only the segmented electrode #1 is coupled to the receiver circuit 2 or the transmitter circuit 3 and only the electrode area of the segmented electrode #1 becomes the effective electrode area. Meanwhile, when both the analog switches SW1 and SW2 are on, both the segmented electrode #1 and the segmented electrode #2 are coupled to the receiver circuit 2 or the transmitter circuit 3 and the total electrode area of the segmented electrode #1 and the segmented electrode #2 becomes the effective electrode area.

It is to be noted that although FIG. 5 illustrates an example where only the two segmented electrodes #1 and #2 are provided, additional single or plurality of segmented electrodes may be provided around the segmented electrode #2, and the segmented electrodes may be independently coupled to respective analog switches SW. This makes it possible to change the effective electrode area among three or more states.

FIG. 6 illustrates a third example of the electrode structure of the antenna 13.

At least one of the human body electrode 11 or the space electrode 12 may have an electrode structure where a plurality of rectangular segmented electrodes #1, #2, ... #n is arranged in matrix as illustrated in FIG. 6. In the electrode structure of FIG. 6, the segmented electrodes #1, #2, ... #n are independently to be coupled to the receiver circuit 2 or the transmitter circuit 3 through respective analog switches SW1, SW2 ... SWn. The analog switches SW1, SW2 ... SWn may be included in the switch 4. Thus, total electrode area of, among the plurality of rectangular segmented electrodes #1, #2, ... #n, ones coupled to the analog switches that are turned on becomes the effective electrode area. Consequently, for example, the effective electrode area is changeable between two states: where the electrode areas of two or more of the segmented electrodes #1, #2, ... #n disposed in a middle region 14 provide the effective electrode area; and where the electrode areas of all the segmented electrodes provide the effective electrode area. Actually, it is possible to change the effective electrode area to a state substantially similar to that in the electrode structures of FIG. 4 and FIG. 5.

Moreover, in the electrode structure of FIG. 6, it is also possible to change the effective electrode area among three or more states.

FIG. 7 illustrates a fourth example of the electrode structure of the antenna 13.

At least one of the human body electrode 11 or the space electrode 12 may have an electrode structure where a plurality of concentric segmented electrodes #1, #2, ... #n is arranged as illustrated in FIG. 7. It is to be noted that although FIG. 7 illustrates an example where the three segmented electrodes #1, #2, and #3 are provided, the electrode structure may have an arrangement of two concentric segmented electrodes or four or more concentric segmented electrodes.

Description will be made here on an example where the three segmented electrodes #1, #2, and #3 are provided. In the electrode structure of FIG. 7, the segmented electrodes #1, #2, and #3 are independently to be coupled to the receiver circuit 2 or the transmitter circuit 3 through respective analog switches SW1, SW2, and SW3. The analog switches SW1, SW2, and SW3 may be included in the switch 4. Thus, for example, total electrode area of, among the plurality of concentric segmented electrodes #1, #2, ... #3, ones coupled to the analog switches that are turned on becomes the effective electrode area. Consequently, for example, the effective electrode area is changeable among three states: where the electrode area of the segmented electrode #1, which is the most centered among the segmented electrodes #1, #2, and #3, becomes the effective electrode area; where total electrode area of the segmented electrode #1 and the segmented electrode #2 around the segmented electrode #1 becomes the effective electrode area; and where total electrode area of the three segmented electrodes #1, #2, and #3 becomes the effective electrode area.

[1.2 Operation]

Description will be made below on a switching operation for the electrode structure in the communication device 1. For simplicity, it is assumed hereinbelow that, for example, the electrode structure of the antenna 13 includes the two segmented electrodes #1 and #2 as illustrated in FIG. 4 and FIG. 5 and the effective electrode area is changeable between two states, that is, relatively large state and small state.

FIG. 8 illustrates an example of a communication operation in a communication system including the communication device 1 according the present embodiment along with the switching operation for the electrode structure.

FIG. 8 illustrates an example of the communication system including a Talker (calling terminal) 1A and a Listener (receiving terminal) 1B. FIG. 8 also illustrates an example where the Talker 1A and the Listener 1B each include the communication device 1 according to the present embodiment to make the effective electrode areas of both the Talker 1A and the Listener 1B changeable. It is to be noted that only either one of the Talker 1A or the Listener 1B may include the communication device 1 according to the present embodiment to make the effective electrode area of the one of the Talker 1A or the Listener 1B changeable.

A communication protocol according to the CCCC-PHY standards includes an association (Association) stage and a data communication stage, which is subsequent to the association stage, as communication stages.

In the association stage, a two-stage association is performed. In response to receiving a first association request (Association Request 1) as transmission data from the Talker1 A, the Listener 1B returns a first association response (Association Response 1) as transmission data to the Talker 1A. Subsequently, in response to receiving a second association request (Association Request 2) as transmission data from the Talker 1A, the Listener 1B returns a second association response (Association Response 2) as transmission data to the Talker 1A.

In response to receiving the second association response from the Listener 1B, the Talker 1A moves on to the data communication stage, transmitting real data as transmission data to the Listener 1B. The Listener 1B returns an acknowledgement (Ack) as transmission data.

In the association stage, the protocol control section 61 of the controller 6 changes the effective electrode area of the antenna 13 to be smaller than in the data communication stage. Referring to an example with the electrode structure of FIG. 4, the protocol control section 61 controls the switch 4 in the association stage to turn off the analog switch SW, causing only the electrode area of the segmented electrode #1 to become the effective electrode area. Meanwhile, in the data communication stage, the protocol control section 61 controls the switch 4 to turn on the analog switch SW, causing the total electrode area of the segmented electrode #1 and the segmented electrode #2 to become the effective electrode area.

FIG. 9 schematically illustrates an example of a switching control flow for the electrode structure by the communication device 1 according to the present embodiment.

The protocol control section 61 first sets only the segmented electrode #1 as an electrode in use in the antenna 13 (Step S101). Referring to an example with the electrode structure of FIG. 4, the protocol control section 61 controls the switch 4 to turn off the analog switch SW, causing only the electrode area of the segmented electrode #1 to become the effective electrode area.

Next, the protocol control section 61 determines whether or not association has been completed (Step S102). If the association is determined not to have been completed (Step S102; N), the process returns to Step S101.

Meanwhile, if the association is determined to have been completed (Step S102; Y), the protocol control section 61 then sets both the segmented electrode #1 and the segmented electrode #2 as electrodes in use in the antenna 13 (Step S103). Referring to an example with the electrode structure of FIG. 4, the protocol control section 61 controls the switch 4 to turn on the analog switch SW, causing the total electrode area of the segmented electrode #1 and the segmented electrode #2 to become the effective electrode area.

Next, the protocol control section 61 determines whether or not coupling to a communication partner is to be terminated (Disassociation) (Step S104). If termination of the coupling is not determined (Step S104; N), the process returns to Step S103.

Meanwhile, if termination of the coupling is determined (Step S104; Y), the protocol control section 61 causes the process to return to Step S101.

[1.3 Effects]

According to the present embodiment, the effective electrode area of the antenna 13 is changed on the basis of the communication stages as described above, making it possible to suppress erroneous communication and stabilize communication.

Specifically, the effective electrode area of the antenna 13 is made smaller in the association stage than in the subsequent data communication stage, thereby lowering the transmission performance for prevention of erroneous connection resulting from excessive transmission performance. After the association, it is possible to make the data transmission robust by making the effective electrode area of the antenna 13 larger than in the association stage.

It is to be noted that any effect described herein is merely an example and not limitative and another effect is also possible. The same applies to the effects of other embodiments hereinbelow.

2. SECOND EMBODIMENT

Next, a communication device and a communication system according to a second embodiment of the present disclosure will be described. It is to be noted that like reference numerals are used hereinbelow to refer to portions substantially the same as components of the communication device and the communication system according to the first embodiment and the explanations are omitted as necessary.

[2.1 Configuration and Operation]

A configuration of the communication device 1 according to the present embodiment may be substantially similar to the configuration of FIG. 3. In addition, an electrode structure of the antenna 13 may be any one of the electrode structures of FIG. 4 to FIG. 7, for example.

In the first embodiment, the protocol control section 61 of the controller 6 changes the effective electrode area of at least one of the human body electrode 11 or the space electrode 12 with use of the switch 4 on the basis of the communication stages in the communication protocol. In contrast, in the present embodiment, the protocol control section 61 changes the effective electrode area of at least one of the human body electrode 11 or the space electrode 12 with use of the switch 4 on the basis of an operation (transmission operation and reception operation) of a communication circuit (receiver circuit 2 and transmitter circuit 3).

FIG. 10 illustrates an example of a transmission format according to the CCCC-PHY standards. For example, the communication device 1 according to the present embodiment enables communication in a transmission format compliant with the CCCC-PHY standards illustrated in FIG. 10.

According to the CCCC-PHY standards, transmission data is transmitted between at least one device to be communicated and the communication device 1 for each of time segments at predetermined intervals. Each time segment includes the plurality of time slots (Time slots, TDSs (Time Division Slots)) segmented into the predetermined number.

The communication device 1 receives transmission data from the device to be communicated throughout a period corresponding to the plurality of time segments. The transmission data from the device to be communicated is transmitted during a period corresponding to one of the plurality of time slots of each of the plurality of time segments. In a case where a plurality of devices to be communicated or communication devices 1 is provided, individual devices have mutually different time slots assigned in one time segment. The time slots are assigned by the device to be communicated or the communication device 1 that first starts communication.

The transmission data transmitted during the period corresponding to one time slot is packet data. The packet data includes preamble (Preamble), synchronous (Sync) data, attribute (Attribute) data, TDS Number, and sequence number (retransmission number). The packet data also includes payload, that is, real data of the transmission data, and CRC (Cyclic Redundancy Check) as an error-detecting code.

In transmitting the transmission data in the communication device 1, for example, the transmission data is transmitted by the transmitter circuit 3 at a time slot TDS1. Meanwhile, in receiving the transmission data, for example, the transmission data is received by the receiver circuit 2 at a time slot TDS5.

The receiver circuit 2 and the transmitter circuit 3 thus time-divisionally perform the transmission operation and the reception operation relative to the device to be communicated. In the present embodiment, the protocol control section 61 changes the effective electrode area to be smaller in performing the transmission operation than in performing the reception operation.

FIG. 11 schematically illustrates an example of a switching control flow for the electrode structure by the communication device 1 according to the present embodiment. For simplicity, it is assumed hereinbelow that, for example, the electrode structure of the antenna 13 includes the two segmented electrodes #1 and #2 as illustrated in FIG. 4 and FIG. 5 and the effective electrode area is changeable between two states, that is, relatively large state and small state.

The protocol control section 61 first sets both the segmented electrode #1 and the segmented electrode #2 as electrodes in use in the antenna 13 (Step S201). Referring to an example with the electrode structure of FIG. 4, the protocol control section 61 controls the switch 4 to turn on the analog switch SW, causing the total electrode area of the segmented electrode #1 and the segmented electrode #2 to become the effective electrode area.

Next, the protocol control section 61 determines whether or not the transmission operation is to be started by the transmitter circuit 3 (Step S202). If start of the transmission operation is not determined (Step S202; N), the process returns to Step S201.

Meanwhile, if start of the transmission operation is determined (Step S202; Y), the protocol control section 61 then sets only the segmented electrode #1 as the electrode in use in the antenna 13 (Step S203). Referring to an example with the electrode structure of FIG. 4, the protocol control section 61 controls the switch 4 to turn off the analog switch SW, causing only the electrode area of the segmented electrode #1 to be become effective electrode area.

Next, the protocol control section 61 determines whether or not the transmission operation has been completed (Step S204). If the transmission operation is determined not to have been completed (Step S204; N), the process returns to Step S203.

Meanwhile, the transmission operation is determined to have been completed (Step S204; Y), the protocol control section 61 causes the process to return to Step S201.

[2.2 Effects]

According to the present embodiment, the effective electrode area of the antenna 13 is changed to be smaller in performing the transmission operation than in performing the reception operation as described above. This allows for lowering only the transmission performance while maintaining the reception performance, thus preventing erroneous connection resulting from excessive transmission performance. In addition, it is possible to reduce interference (given interference) with a nearby device by lowering the transmission performance.

3. THIRD EMBODIMENT

Next, a communication device and a communication system according to a third embodiment of the present disclosure will be described. It is to be noted that like reference numerals are used hereinbelow to refer to portions substantially the same as components of the communication device and the communication system and the explanations according to the first or second embodiment are omitted as necessary.

[3.1 Configuration and Operation]

A configuration of the communication device 1 according to the present embodiment may be substantially similar to the configuration of FIG. 3. In addition, an electrode structure of the antenna 13 may be any one of the electrode structures of FIG. 4 to FIG. 7, for example.

In the first embodiment, the protocol control section 61 of the controller 6 changes the effective electrode area of the antenna 13 to be smaller constantly in the association stage than in the data communication stage. In contrast, in the present embodiment, the protocol control section 61 changes the effective electrode area on the basis of the transmission/reception operation in the association stage. In the association stage, the protocol control section 61 changes the effective electrode area of the antenna 13 to be smaller in performing the transmission operation than in performing the reception operation.

FIG. 12 illustrates an example of a communication operation in a communication system including the communication device 1 according to the present embodiment along with the switching operation for the electrode structure. For simplicity, it is assumed hereinbelow that, for example, the electrode structure of the antenna 13 includes the two segmented electrodes #1 and #2 as illustrated in FIG. 4 and FIG. 5 and the effective electrode area is changeable between two states, that is, relatively large state and small state.

FIG. 12 illustrates an example of a communication system including the Talker 1A and the Listener 1B in the similar manner to the example of FIG. 8. FIG. 12 also illustrates an example where the Talker 1A and the Listener 1B each include the communication device 1 according to the present embodiment to make the effective electrode areas of both the Talker 1A and the Listener 1B changeable. It is to be noted that only either one of the Talker 1A or the Listener 1B may include the communication device 1 according to the present embodiment to make the effective electrode area of the one of the Talker 1A or the Listener 1B changeable.

The protocol control section 61 sets both the segmented electrode #1 and the segmented electrode #2 as the electrodes in use in the antenna 13 as an initial state. Referring to an example with the electrode structure of FIG. 4, the protocol control section 61 controls the switch 4 to turn on the analog switch SW, causing the total electrode area of the segmented electrode #1 and the segmented electrode #2 to become the effective electrode area.

A communication protocol according to the CCCC-PHY standards includes an association (Association) stage and a data communication stage, which is subsequent to the association stage, as communication stages.

In the association stage, a two-stage association is performed. In response to receiving a first association request (Association Request 1) as transmission data from the Talker 1A, the Listener 1B returns a first association response (Association Response 1) as transmission data to the Talker 1A. In this stage, the protocol control section 61 in the Talker 1A side changes the effective electrode area of the antenna 13 to be smaller in transmitting the first association request. Referring to an example with the electrode structure of FIG. 4, the protocol control section 61 in the Talker 1A side controls the switch 4 to turn off the analog switch SW, causing only the electrode area of the segmented electrode #1 to become the effective electrode area. Similarly, the protocol control section 61 in the Listener 1B side changes the effective electrode area of the antenna 13 to be smaller in transmitting the first association response.

Subsequently, in response to receiving the second association request (Association Request 2) as transmission data from the Talker 1A, the Listener 1B returns the second association response (Association Response 2) as transmission data to the Talker 1A. In this stage, the protocol control section 61 in the Talker 1A side also changes the effective electrode area of the antenna 13 to be smaller in transmitting the second association request. Similarly, the protocol control section 61 in the Listener 1B side changes the effective electrode area of the antenna 13 to be smaller in transmitting the second association response.

Other configurations, operations, and effects may be substantially similar to those of the communication device and the communication system according to the first embodiment.

4. FOURTH EMBODIMENT

Next, a communication device and a communication system according to a fourth embodiment of the present disclosure will be described. It is to be noted that like reference numerals are used hereinbelow to refer to portions substantially the same as components of the communication device and the communication system according to any one of the first to third embodiments and the explanations are omitted as necessary.

[4.1 Configuration and Operation]

A configuration of the communication device 1 according to the present embodiment may be substantially similar to the configuration of FIG. 3. In addition, an electrode structure of the antenna 13 may be any one of the electrode structures of FIG. 4 to FIG. 7, for example.

In the first and third embodiments, the effective electrode area of the antenna 13 is the same in size constantly throughout the data communication stage. In contrast, in the present embodiment, the protocol control section 61 changes the effective electrode area of the antenna 13 on the basis of a type of transmission data in the data communication stage.

FIG. 13 and FIG. 14 respectively illustrate first and second examples of a communication operation in a communication system including the communication device 1 according to the present embodiment along with the switching operation for the electrode structure. For simplicity, it is assumed hereinbelow that, for example, the electrode structure of the antenna 13 includes the two segmented electrodes #1 and #2 as illustrated in FIG. 4 and FIG. 5 and the effective electrode area is changeable between two states, that is, relatively large state and small state.

It is to be noted that an operation in the association stage may be substantially similar to the first or third embodiment.

First Example of Transmission Operation

In a case of returning to the device to be communicated an acknowledgement (Ack) of the transmission data received from the device to be communicated, the protocol control section 61 of the controller 6 may change the effective electrode area of the antenna 13 to be larger than in performing the transmission/reception operation of real data.

For example, as illustrated in the first example of FIG. 13, first real data (Data (0)) is transmitted as transmission data from the Talker 1A to the Listener 1B in the data communication stage. In response, the Listener 1B returns a first acknowledgement (Ack (0)) as transmission data. Subsequently, second real data (Data (1)) is transmitted as transmission data from the Talker 1A to the Listener 1B. In response, the Listener 1B returns a second acknowledgement (Ack (1)) as transmission data.

In this case, the protocol control section 61 may set only the segmented electrode #1 as the electrode in use in the antenna 13 as the initial state in the data communication stage. Referring to an example with the electrode structure of FIG. 4, in each of the Talker 1A and Listener 1B, the protocol control section 61 controls the switch 4 to turn off the analog switch SW, causing only the electrode area of the segmented electrode #1 to become the effective electrode. In the Listener 1B side, both the segmented electrode #1 and the segmented electrode #2 are set as the electrodes in use in the antenna 13 in returning the acknowledgement (Ack (0), Ack (1)) as transmission data. Referring to an example with the electrode structure of FIG. 4, the protocol control section 61 controls the switch 4 to turn on the analog switch SW, causing the total electrode area of the segmented electrode #1 and the segmented electrode #2 to become the effective electrode area.

In the first example of FIG. 13, the Talker 1A is allowed to transmit the subsequent second real data (Data (1)) in response to receiving the first acknowledgement (Ack (0)). Accordingly, to ensure that the acknowledgment (Ack (0)) is reliably transmitted to the Talker 1A, the total effective electrode area of the segmented electrode #1 and the segmented electrode #2 is set as the effective electrode area in the Listener 1B for an improved transmission performance.

Second Example of Communication Operation

In addition to the first example, the protocol control section 61 of the controller 6 may further change the effective electrode area of the antenna 13 to be larger in receiving the acknowledgement than in performing the transmission/reception operation of real data.

For example, in each of the Talker 1A and the Listener 1B, only the segmented electrode #1 may be set as the electrode in use in the antenna 13 as the initial state in the data communication stage as illustrated in the second example of FIG. 14. In the Listener 1B side, both the segmented electrode #1 and the segmented electrode #2 are set as the electrodes in use in the antenna 13 in returning the acknowledgement (Ack (0), Ack (1)) as transmission data. Moreover, in the Talker 1A side, both the segmented electrode #1 and the segmented electrode #2 are set at the electrodes in use in the antenna 13 in receiving the acknowledgement (Ack (0), Ack (1)).

Thus, in a case where the Talker 1A side has already known that the acknowledgement is to be received after the transmission of the real data, the effective electrode area of the antenna 13 is increased after the transmission of the real data. This enables the Talker 1A side to receive the acknowledgement with a higher reliability.

Other configurations, operations, and effects may be substantially similar to those of the communication device and the communication system according to the first or third embodiment.

5. FIFTH EMBODIMENT

Next, a communication device and a communication system according to a fifth embodiment of the present disclosure will be described. It is to be noted that like reference numerals are used hereinbelow to refer to portions substantially the same as components of the communication device and the communication system according to any one of the first to fourth embodiments and the explanations are omitted as necessary.

[5.1 Configuration and Operation]

A configuration of the communication device 1 according to the present embodiment may be substantially similar to the configuration of FIG. 3. In addition, an electrode structure of the antenna 13 may be any one of the electrode structures of FIG. 4 to FIG. 7, for example.

In the first and third embodiments, the effective electrode area is the same in size constantly throughout the data communication stage. In contrast, in the present embodiment, the protocol control section 61 changes the effective electrode area of the antenna 13 on the basis of a type of transmission data in the data communication stage.

FIG. 15 and FIG. 16 respectively illustrate first and second examples of a communication operation in a communication system including the communication device 1 according to the present embodiment along with the switching operation for the electrode structure. For simplicity, it is assumed hereinbelow that, for example, the electrode structure of the antenna 13 includes the two segmented electrodes #1 and #2 as illustrated in FIG. 4 and FIG. 5 and the effective electrode area is changeable between two states, that is, relatively large state and small state.

It is to be noted that an operation in the association stage may be substantially similar to the first or third embodiment. In addition, a switching operation for the electrode structure in transmitting/receiving an acknowledgement (Ack) may be substantially similar to the fourth embodiment. FIG. 15 and FIG. 16 each illustrate a case where the switching operation for the electrode structure in transmitting/receiving an acknowledgement (Ack) is the same as in an example of FIG. 13.

The CCCC-PHY employs automatic repeat request (ARQ: Automatic Repeat reQuest) using an error-detecting code and a retransmission control. In the communication device 1 according to the present embodiment, the transmission operation by the transmitter circuit 3 includes retransmitting transmission data to a device to be communicated in response to a retransmission request.

In retransmitting transmission data in the data communication stage, the protocol control section 61 of the controller 6 may change the effective electrode area of the antenna 13 to be larger than before the retransmission.

First Example of Communication Operation

For example, as illustrated in the first example of FIG. 15, first real data (Data (0)) is transmitted as transmission data from the Talker 1A to the Listener 1B in the data communication stage. In response, the Listener 1B returns a first acknowledgement (Ack (0)) as transmission data. Subsequently, second real data (Data (1)) is transmitted as transmission data from the Talker 1A to the Listener 1B. At this time, for example, if the second real data (Data (1)) is partly missing, the Listener 1B returns another first acknowledgement (Ack (0)) instead of a second acknowledgement (Ack (1)). In this manner, retransmission of the second real data (Data (1)) is explicitly requested to the Talker 1A. In response to the retransmission request, the Talker 1A retransmits the second real data (Data (1)).

In this case, the protocol control section 61 may set only the segmented electrode #1 as the electrode in use in the antenna 13 as the initial state in the data communication stage. Referring to an example with the electrode structure of FIG. 4, in each of the Talker 1A and Listener 1B, the protocol control section 61 controls the switch 4 to turn off the analog switch SW, causing only the electrode area of the segmented electrode #1 to become the effective electrode. In the Talker 1A side, in response to the retransmission request, both the segmented electrode #1 and the segmented electrode #2 are set as the electrodes in use in the antenna 13 in retransmitting the second real data (Data (1)). Referring to an example with the electrode structure of FIG. 4, the protocol control section 61 controls the switch 4 to turn on the analog switch SW, causing the total electrode area of the segmented electrode #1 and the segmented electrode #2 to become the effective electrode area. This improves the transmission performance, ensuring that the second real data (Data (1)) is received by the Listener 1B when retransmitted.

Second Example of Communication Operation

For example, as illustrated in the second example of FIG. 16, first real data (Data (0)) is transmitted as transmission data from the Talker 1A to the Listener 1B in the data communication stage. In response, the Listener 1B returns a first acknowledgement (Ack (0)) as transmission data. Subsequently, second real data (Data (1)) is transmitted as transmission data from the Talker 1A to the Listener 1B. At this time, for example, if the Listener 1B receives none of the second real data (Data (1)), the Listener 1B returns no second acknowledgement (Ack (1)). In addition, no retransmission request is returned, either. If having received neither the second acknowledgement (Ack (1)) nor the retransmission request even after the elapse of a certain period of time since transmitting the second real data (Data (1)), the Talker 1A retransmits the second real data (Data (1)). In this case, in the Talker 1A side, both the segmented electrode #1 and the segmented electrode #2 are set at the electrodes in use in the antenna 13 in retransmitting the second real data (Data (1)) in the similar manner to the first example of FIG. 15, thereby improving the transmission performance and ensuring that the second real data (Data (1)) is received by the Listener 1B when retransmitted.

Other configurations, operations, and effects may be substantially similar to those of the communication device and the communication system according to the first, third, or fourth embodiment.

6. SIXTH EMBODIMENT

Next, a communication device and a communication system according to a sixth embodiment of the present disclosure will be described. It is to be noted that like reference numerals are used hereinbelow to refer to portions substantially the same as components of the communication device and the communication system according to any one of the first to fifth embodiments and the explanations are omitted as necessary.

[6.1 Configuration and Operation]

A configuration of the communication device 1 according to the present embodiment may be substantially similar to the configuration of FIG. 3. In addition, an electrode structure of the antenna 13 may be any one of the electrode structures of FIG. 4 to FIG. 7, for example.

In the first and third embodiments, the effective electrode area is the same in size constantly throughout the data communication stage. In contrast, in the present embodiment, the protocol control section 61 changes the effective electrode area of the antenna 13 on the basis of a type of transmission data in the data communication stage.

FIG. 17 and FIG. 18 respectively illustrate first and second examples of a communication operation in a communication system including the communication device 1 according to the present embodiment along with the switching operation for the electrode structure. For simplicity, it is assumed hereinbelow that, for example, the electrode structure of the antenna 13 includes the two segmented electrodes #1 and #2 as illustrated in FIG. 4 and FIG. 5 and the effective electrode area is changeable between two states, that is, relatively large state and small state.

It is to be noted that an operation in the association stage may be substantially similar to the first or third embodiment. In addition, a switching operation for the electrode structure in transmitting/receiving an acknowledgement (Ack) may be substantially similar to the fourth embodiment. FIG. 17 and FIG. 18 each illustrate a case where the switching operation for the electrode structure in transmitting/receiving an acknowledgement (Ack) is the same as in the example of FIG. 13.

In the communication device 1 according to the present embodiment, the transmission operation by the transmitter circuit 3 includes transmitting link control information as transmission data to a device to be communicated.

In transmitting the link control information, the protocol control section 61 of the controller 6 may change the effective electrode area of the antenna 13 to be larger than in performing another operation such as at least the reception operation.

For example, as illustrated in FIG. 17 and FIG. 18, the protocol control section 61 may set only the segmented electrode #1 as the electrode in use in the antenna 13 as the initial state in the data communication stage. Referring to an example with the electrode structure of FIG. 4, in each of the Talker 1A and Listener 1B, the protocol control section 61 controls the switch 4 to turn off the analog switch SW, causing only the electrode area of the segmented electrode #1 to become the effective electrode.

Moreover, for example, in transmitting the link control information (Control) from the Talker 1A side, both the segmented electrode #1 and the segmented electrode #2 may be set at the electrodes in use in the antenna 13. Referring to an example with the electrode structure of FIG. 4, the protocol control section 61 controls the switch 4 to turn on the analog switch SW, causing the total electrode area of the segmented electrode #1 and the segmented electrode #2 to become the effective electrode area.

Other configurations, operations, and effects may be substantially similar to those of the communication device and the communication system according to the first, third, or fourth embodiment.

7. SEVENTH EMBODIMENT (APPLICATION EXAMPLE)

The technology according to the present disclosure is applicable to various products. For example, the technology of the present disclosure may be achieved in the form of an apparatus to be mounted to a mobile body of any kind. Examples of the mobile body include an automobile, an electric vehicle, a hybrid electric vehicle, a motorcycle, a bicycle, a personal mobility, an airplane, a drone, a vessel, a robot, a construction machine, and an agricultural machine (tractor).

FIG. 19 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 19, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 19 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 20 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 20 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 19, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like.

The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 19, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 19 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the communication device and the communication system according to the present disclosure are applicable to communication, via the general-purpose communication I/F 7620, with the external environment 7750 such as a terminal present near the vehicle, for example. In addition, it is possible to apply them to communication, via the in-vehicle device I/F 7660, with a mobile device of the occupant or with the in-vehicle devices 7760 such as a wearable device.

8. OTHER EMBODIMENTS

The technique according to the present disclosure may be modified in a variety of manners without limitation to the descriptions of the above embodiments.

For example, the components in the above embodiments may each be divided into a plurality of components and the plurality of divided components may have different functions.

Moreover, for example, any control flow in the above embodiments may be performed with the omission of a part of the processing steps. Moreover, the control flow may be performed with the addition of another processing step not described in the control flow. Moreover, the control flow may be performed in a partly rearranged order of the processing steps in the control flow.

For example, the present technology may be implemented in the follow configurations.

(1)

A communication device including:

an antenna including a first electrode and a second electrode, at least one of the first electrode or the second electrode including a plurality of segmented electrodes;

a communication circuit that is coupled to the antenna, and performs, through the antenna, a transmission operation and a reception operation of transmission data between a device to be communicated and the communication circuit, in accordance with a communication protocol that includes a plurality of communication stages;

a switch that switches whether or not each of the plurality of segmented electrodes is to be coupled to the communication circuit, to change effective electrode area of at least one of the first electrode or the second electrode; and a controller that changes the effective electrode area of at least one of the first electrode or the second electrode by the switch, on the basis of at least one of the operations of the communication circuit, a type of the transmission data, or the communication stages.

(2)

The communication device according to (1), in which the plurality of communication stages includes an association stage and a data communication stage that is subsequent to the association stage, and the controller changes the effective electrode area to be smaller in the association stage than in the data communication stage.

(3)

The communication device according to (1), in which the communication circuit time-divisionally performs the transmission operation and the reception operation between the device to be communicated and the communication circuit, and the controller changes the effective electrode area to be smaller in performing the transmission operation than in performing the reception operation.

(4)

The communication device according to (1), in which the plurality of communication stages includes an association stage and a data communication stage that is subsequent to the association stage, the communication circuit time-divisionally performs the transmission operation and the reception operation between the device to be communicated and the communication circuit, and the controller changes, in the association stage, the effective electrode area to be smaller in performing the transmission operation than in performing the reception operation.

(5)

The communication device according to (1) or (2), in which the transmission operation by the communication circuit includes returning to the device to be communicated an acknowledgement of the transmission data received from the device to be communicated, and the controller changes the effective electrode area to be larger in performing the returning of the acknowledgement than in performing the reception operation.

(6)

The communication device according to (1) or (2), in which the reception operation by the communication circuit includes receiving an acknowledgement from the device to be communicated, and the controller changes the effective electrode area to be larger in performing the receiving of the acknowledgement than in performing the transmission operation.

(7)

The communication device according to (1) or (2), in which the transmission operation by the communication circuit includes retransmitting the transmission data to the device to be communicated, and the controller changes the effective electrode area to be larger in performing the retransmitting of the transmission data than before performing the retransmitting.

(8)

The communication device according to (1) or (2), in which the transmission operation by the communication circuit includes transmitting, to the device to be communicated, link control information as the transmission data, and the controller changes the effective electrode area to be larger in performing the transmitting of the link control information than in performing at least the reception operation.

(9)

The communication device according to any one of (1) to (8), in which the communication circuit performs, through the antenna, communication in which a human body serves as a communication medium.

(10)

A communication system including:

a first communication device; and a second communication device that performs transmission of transmission data between the first communication device and the second communication device, at least one of the first communication device or the second communication device including an antenna including a first electrode and a second electrode, at least one of the first electrode or the second electrode including a plurality of segmented electrodes, a communication circuit that is coupled to the antenna, and performs, through the antenna, a transmission operation and a reception operation of the transmission data between a device to be communicated and the communication circuit, in accordance with a communication protocol that includes a plurality of communication stages, the first communication device or the second communication device serving as the device to be communicated, a switch that switches whether or not each of the plurality of segmented electrodes is to be coupled to the communication circuit, to change effective electrode area of at least one of the first electrode or the second electrode, and a controller that changes the effective electrode area of at least one of the first electrode or the second electrode by the switch, on the basis of at least one of the operations of the communication circuit, a type of the transmission data, or the communication stages.

(11)

The communication system according to (10), in which the second communication device performs communication with the first communication device in which a human body serves as a communication medium.

(12)

A communication method including:

performing, with a communication circuit coupled to an antenna, a transmission operation and a reception operation between a device to be communicated and the communication circuit through the antenna, in accordance with a communication protocol that includes a plurality of communication stages, the antenna including a first electrode and a second electrode, at least one of the first electrode or the second electrode including a plurality of segmented electrodes;

switching, with a switch, whether or not each of the plurality of segmented electrodes is to be coupled to the communication circuit, to change effective electrode area of at least one of the first electrode or the second electrode; and changing, by controlling the switch by a controller, the effective electrode area of at least one of the first electrode or the second electrode, on the basis of at least one of the operations of the communication circuit, a type of the transmission data, or the communication stages.

The present application claims priority based on Japanese Patent Application No. 2017-156535 filed with the Japan Patent Office on Aug. 14, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A communication device, comprising:
an antenna including a first electrode and a second electrode, wherein at least one of the first electrode or the second electrode includes a plurality of segmented electrodes;
a communication circuit coupled to the antenna, wherein
the communication circuit is configured to execute, through the antenna, a transmission operation and a reception operation of transmission data between a device and the communication circuit, and
the execution of the transmission operation and the reception operation is based on a communication protocol that includes a plurality of communication stages, wherein the plurality of communication stages includes an association stage and a data communication stage that is subsequent to the association stage;
a switch configured to couple at least one of the plurality of segmented electrodes to the communication circuit, to change an effective electrode area of the at least one of the first electrode or the second electrode; and a controller configured to control the switch to change the effective electrode area of the at least one of the first electrode or the second electrode, wherein the control of the switch is based on at least one of the transmission operation by the communication circuit, a type of the transmission data, or the plurality of communication stages, and the effective electrode area is smaller in the association stage than in the data communication stage.

2. The communication device according to claim 1, wherein the communication circuit is further configured to time-divisionally execute the transmission operation and the reception operation between the device and the communication circuit, and the controller is further configured to control, in the association stage, the switch to change the effective electrode area to be smaller in the execution of the transmission operation than in the execution of the reception operation.

3. The communication device according to claim 1, wherein the transmission operation by the communication circuit includes transmission, to the device, of an acknowledgement of the transmission data received from the device, and the controller is further configured to control the switch to change the effective electrode area to be larger in the transmission of the acknowledgement than in the execution of the reception operation.

4. The communication device according to claim 1, wherein the reception operation by the communication circuit includes reception of an acknowledgement from the device, and the controller is further configured to control the switch to change the effective electrode area to be larger in the reception of the acknowledgement than in the execution of the transmission operation.

5. The communication device according to claim 1, wherein the transmission operation by the communication circuit includes retransmission of the transmission data to the device, and the controller is further configured to control the switch to change the effective electrode area to be larger in the retransmission of the transmission data than before the retransmission.

6. The communication device according to claim 1, wherein the transmission operation by the communication circuit includes transmission, to the device, of link control information as the transmission data, and the controller is further configured to control the switch to change the effective electrode area to be larger in the transmission of the link control information than in the execution of the reception operation.

7. The communication device according to claim 1, wherein the communication circuit is further configured to perform, through the antenna, communication in which a human body serves as a communication medium.

8. A communication system, comprising:
a first communication device; and
a second communication device configured to perform transmission of transmission data between the first communication device and the second communication device, wherein at least one of the first communication device or the second communication device includes:

an antenna including a first electrode and a second electrode, wherein at least one of the first electrode or the second electrode includes a plurality of segmented electrodes, a communication circuit coupled to the antenna, wherein the communication circuit is configured to execute, through the antenna, a transmission operation and a reception operation of the transmission data between a device and the communication circuit, the execution of the transmission operation and the reception operation is based on a communication protocol that includes a plurality of communication stages, wherein the plurality of communication stages includes an association stage and a data communication stage that is subsequent to the association stage, and one of the first communication device or the second communication device corresponds to the device, a switch configured to couple at least one of the plurality of segmented electrodes to the communication circuit, to change an effective electrode area of the at least one of the first electrode or the second electrode, and a controller configured to control the switch to change the effective electrode area of the at least one of the first electrode or the second electrode, wherein the control of the switch is based on at least one of the transmission operation by the communication circuit, a type of the transmission data, or the plurality of communication stages, and the effective electrode area is smaller in the association stage than in the data communication stage.

9. The communication system according to claim 8, wherein the second communication device is further configured to perform communication with the first communication device in which a human body serves as a communication medium.

10. A communication method, comprising:
executing, with a communication circuit coupled to an antenna, a transmission operation and a reception operation of transmission data between a device and the communication circuit through the antenna, wherein the execution of the transmission operation and the reception operation is based on a communication protocol that includes a plurality of communication stages, the plurality of communication stages includes an association stage and a data communication stage that is subsequent to the association stage, the antenna includes a first electrode and a second electrode, and at least one of the first electrode or the second electrode includes a plurality of segmented electrodes;

coupling, with a switch, at least one of the plurality of segmented electrodes to the communication circuit, to change an effective electrode area of the at least one of the first electrode or the second electrode; and changing, by controlling the switch by a controller, the effective electrode area of the at least one of the first electrode or the second electrode, wherein the control of the switch is based on at least one of the transmission operation by the communication circuit, a type of the transmission data, or the plurality of communication stages, and the effective electrode area is smaller in the association stage than in the data communication stage.

11. A communication device, comprising:

an antenna including a first electrode and a second electrode, wherein at least one of the first electrode or the second electrode includes a plurality of segmented electrodes;

a communication circuit coupled to the antenna, wherein
the communication circuit is configured to time-divisionally execute, through the antenna, a transmission operation and a reception operation of transmission data between a device and the communication circuit, and the time-divisional execution of the transmission operation and the reception operation is based on a communication protocol that includes a plurality of communication stages;

a switch configured to couple at least one of the plurality of segmented electrodes to the communication circuit, to change an effective electrode area of the at least one of the first electrode or the second electrode; and a controller configured to control the switch to change the effective electrode area to be smaller in the execution of the transmission operation than in the execution of the reception operation, wherein the control of the switch is based on at least one of the transmission operation by the communication circuit, a type of the transmission data, or the plurality of communication stages.

12. A communication device, comprising:

an antenna including a first electrode and a second electrode, wherein at least one of the first electrode or the second electrode includes a plurality of segmented electrodes;

a communication circuit coupled to the antenna, wherein
the communication circuit is configured to time-divisionally execute, through the antenna, a transmission operation and a reception operation of transmission data between a device and the communication circuit, and the time-divisional execution of the transmission operation and the reception operation is based on a communication protocol that includes a plurality of communication stages, wherein the plurality of communication stages includes an association stage and a data communication stage that is subsequent to the association stage;

a switch configured to couple at least one of the plurality of segmented electrodes to the communication circuit, to change an effective electrode area of the at least one of the first electrode or the second electrode; and a controller configured to control the switch to change the effective electrode area of the at least one of the first electrode or the second electrode, wherein the control of the switch is based on at least one of the transmission operation by the communication circuit, a type of the transmission data, or the plurality of communication stages, and in the association stage, the effective electrode area is smaller in the execution of the transmission operation than in the execution of the reception operation.

\* \* \* \* \*